United States Patent [19]

(12) United States Patent
Tsuge et al.

(10) Patent No.: US 7,529,254 B2
(45) Date of Patent: May 5, 2009

(54) COMMUNICATION APPARATUS AND METHOD FOR INTER-AS ROUTING

(75) Inventors: Munetoshi Tsuge, Hachioji (JP);
Akihito Tsuzuki, Yokohama (JP)

(73) Assignee: Hitachi Communication Technologies, Ltd., Tokyo (JP)

( * ) Notice: Subject to any disclaimer, the term of this patent is extended or adjusted under 35 U.S.C. 154(b) by 790 days.

(21) Appl. No.: 10/926,298

(22) Filed: Aug. 26, 2004

(65) Prior Publication Data
US 2005/0089015 A1     Apr. 28, 2005

(30) Foreign Application Priority Data
Oct. 24, 2003     (JP)     ............................. 2003-364044

(51) Int. Cl.
*H04L 12/28* (2006.01)
(52) U.S. Cl. .................. 370/401; 370/420; 370/469
(58) Field of Classification Search ................. 370/389, 370/392, 400, 401, 420, 464, 465, 469, 474–476
See application file for complete search history.

(56) References Cited
U.S. PATENT DOCUMENTS
6,055,561 A * 4/2000 Feldman et al. ............. 709/200

7,139,278 B2 * 11/2006 Gibson et al. ................ 370/401
2003/0162499 A1 * 8/2003 Jonsson ........................ 455/41
2003/0169689 A1 * 9/2003 Chavali ..................... 370/230.1
2007/0091793 A1 * 4/2007 Filsfils et al. ................ 370/228

FOREIGN PATENT DOCUMENTS
JP     2002-368788     6/2001

* cited by examiner

*Primary Examiner*—Aung S Moe
*Assistant Examiner*—Kerri M Rose
(74) *Attorney, Agent, or Firm*—Reed Smith LLP; Juan Carlos A. Marquez, Esq.

(57) ABSTRACT

Disclosed here is a communication apparatus and method for inter-AS routing, which enables policy routing between a stub AS and an upstream AS. The policy routing includes control which is applicable only between adjacent autonomous systems (AS's). When a subject communication apparatus notifies its own AS number or advertises attribute information that includes its own AS number to a stub AS, the communication apparatus does not use its own AS number or uses the AS number of the upstream autonomous system (AS) instead of its own AS number. In addition, when relaying routing information received from one AS to another, the subject communication apparatus also relays attribute information without discarding the information, although the information is conventionally not relayed to itself.

30 Claims, 11 Drawing Sheets

COMMUNICATION APPARATUS AND METHOD FOR INTER-AS ROUTING

CLAIM OF PRIORITY

The present application claims priority from Japanese application JP 2003-364044 filed on Oct. 24, 2003, the content of which is hereby incorporated by reference into this application.

FIELD OF THE INVENTION

The present invention relates to a communication apparatus deployed inside a communication network and used as a router in the network configured so as to connect one or more stub autonomous systems (AS's) and an upstream AS that is a transit or stub AS to each other through the router (communication apparatus) and a routing method employed for the communication apparatus.

BACKGROUND OF THE INVENTION

Instead of the conventional dial-up Internet connection, always-on high-speed lines (so-called broadband lines) including the ADSL (Asymmetric Digital Subscriber Line) are now rapidly wide-spread among personal users mainly in Japan, Korea, Europe, and America. Many Internet service providers (ISP) provide those personal users with Internet connection services through such always-on high-speed lines. And recently, there has also come to appear some Internet service providers (ISP) and carriers that provide enterprises with access lines to be installed less expensively and more easily. Those access lines, which are oriented to branch offices of enterprises, as well as SOHO (Small Office/Home Office) users, are realized by diverting the infrastructure common to home-use always-on high-speed lines to them.

In the case of the conventional dial-up connection, an RAS (Remote Access Server) that is a communication apparatus for authenticating user connections and collecting accounting information is deployed in each ISP network. The RAS is connected to each user only through a PSTN (Public Switched Telephone Networks) telephone line or with use of its equivalent tunneling protocol in the IP layer. Consequently, the ISP and the users are connected directly in the network layer. The network layer mentioned here means the layer 3 defined in the OSI (Open System Interconnection) reference model. For example, in the TCP/IP (Transmission Control Protocol/Internet Protocol) system, it means the IP layer.

FIG. 4 illustrates a network structure between user networks and ISP networks connected to each other through a conventional enterprise access line and a conventional BGP routing method employed in such a network structure.

Conventional lines such as dedicated, ATM and frame relay lines used for enterprises are regarded as directly connected lines from the standpoint of the network layer, that is, the IP layer. Consequently, if any of such lines is used for the connection between an enterprise user network 101 and an ISP network 103, the user network 101 and the ISP network 103 are regarded as adjacent autonomous systems (AS's) connected directly to each other through the line. Therefore, ordinary EBGP peer sessions can be established between the ordinary BGP routers of those AS's. And, those peer sessions make it possible to realize policy routing easily with use of various attribute information items including such attribute information as MED attributes usable only between adjacent AS's.

In the case of such always-on high-speed lines as ADSL and FTTH (Fiber To The Home); however, the line band width is far wider than that of the dial-up connection. In addition, the ADSL requires deployment of a user line concentrator referred to as a DSLAM (Digital Subscriber Line Access Multiplexer) in each of many line stations existing in a narrow area. This is why access line providers for housing user lines and Internet service providers (ISP) for providing users with Internet connection services have been different except for just a few cAS's in Japan. The access line provider provides a plurality of such Internet service providers (ISP) with ADSL and FTTH access lines. The access line provider connects a plurality of user lines connected to each another through user line concentrators to a kind of router referred to as a BAS (Broadband Access Server) to authenticate the users and aggregate the user traffic on behalf of each ISP and forwards the traffic to each ISP. This is to make user authentication and band_width utilization more efficient.

On the other hand, the policy routing mentioned above means controlling what route should be used for sending/receiving packets in a network according to the intention of the network administrator. As an example of such policy routing, there is a controlling method that determines "an ISP from which communication packets are to be received", "a line to which communication packets are to be sent", etc. A range of networks managed under the same policy is referred to as an autonomous system (AS). Such AS's are divided into two types; global AS having an AS number assigned from an assigning organization and private AS assigned an AS number in the subject network independently. A routing protocol used for routing between different AS's is referred to as an EGP (Exterior Gateway Protocol). The BGP (Border Gateway Protocol) is one of the EGPs used widely. In such a BGP, each router, when receiving routing information, adds various attribute information items to the routing information automatically or according to the setting by the administrator, then advertises the routing information to its adjacent AS's. Consequently, it enables integrated policy routing between AS's which have different policies respectively.

As described above, AS's are divided into transit AS's and stub AS's according to how packets are forwarded between the AS's themselves and other AS's. The stub AS sends only the packets of which the sources are the AS itself to its adjacent AS's and receives only the packets of which the destinations are the AS itself from its adjacent AS's; it never receives packets of which the destinations are other AS's. On the other hand, the transit AS relays packets received from an adjacent AS to another through itself, as well as sends/receives packets from/to itself. A typical transit AS example is an ISP network and a typical stub AS example is a general enterprise network (or each office site of the enterprise).

The BGP is used widely as an inter-AS routing protocol that is practically the standard of routing between transit AS's. On the other hand, no BGP may be used for routing between a transit AS and a stub AS or between stub AS's in some structures of the subject network. For example, just like when an ordinary personal user is connected to an ISP, in a stub AS connected to a single transit AS through a single line, no BGP is usually used for the routing. However, in the case of the multi-home connection for connecting one or more transit AS('s) through a plurality of lines or in the case of the IP-VPN (Virtual Private Network) method, which is one of the technology for providing virtual private lines among a plurality of sites through an ISP network, a BGP is usually used between an edge router deployed in a stub AS and an edge router deployed in a transit AS.

In such a BGP, routers used to exchange routing information directly with each other are connected to each other virtually through TCP sessions and those TCP sessions are used to actually exchange routing information between them. This TCP session is referred to a peer session and the other router of a pair of routers used for the peer session is referred to as a peer router from the standpoint of one of the routers. The peer session is divided into two types; EBGP (External BGP) sessions between routers belonging to different AS's and IBGP (Internal BGP) sessions between routers belonging to the same AS. The EBGP session is used for exchanging routing information between different AS's while the IBGP session is used for sharing routing information obtained by an EBGP session among all the BGP routers in each AS. Routing information obtained through any of those peer sessions is used for policy routing between AS's; it is usually not used for routing in each AS.

To establish an EBGP session between peer routers, both of the routers must be connected to each other directly in the IP layer. This is because only the BGP is used for IP routing between AS's generally, so that those routers, before the EBGP session is established, cannot know any route other than the directly connected one outside those AS's. Unless a route leading to a target peer router in the IP layer is known, it is impossible to establish a TCP session that operates in a layer just above the IP layer with the target peer router. No peer session is thus established in such a case. On the other hand, the IBGP session does not require those peer routers to be connected to each other directly in the IP layer. This is because a routing protocol referred to as an IGP (Interior Gateway Protocol) is used together with the BGP for routing in each AS and this IGP makes the routers know the routing in the AS other than the directly connected one.

Peer routes used for an EBGP session are just required to be connected to each other directly in the IP layer; in the layer 2 and under, they are not required necessarily to be connected to each other directly. In other words, the peer routers may be connected to each other through such a tunneling protocol transparent to the IP layer as the MPLS (Multi Protocol Label Switching), PPP (Point to Point Protocol), L2TP (Layer 2 Tunneling Protocol), or the like. For example, the official gazette of JP-A No. 368788/2002 discloses a technique for adding an MPLS label corresponding to BGP attribute information to each received packet to be forwarded to another AS through the MPLS network, thereby reflecting the BGP policy routing on the packet forwarding in an MPLS network while a plurality of AS's are connected to each another through the MPLS network and policy routing is realized between routers belonging to different AS's through an EBGP session.

[Patent document 1] Official gazette of JP-A No. 368788/2002

In the case of the inter-AS connection through a enterprise line such as a dedicated line, an ATM line, frame relay line, or the like, the line between both AS's such as the line between the enterprise network edge router and the ISP edge router are connected directly to each other in the network layer. Consequently, an AS, for example, an enterprise network AS and an ISP belonging AS can be operated completely as adjacent AS's, so that the AS's can advertise the BGP routes to each other through an EBGP session. In other words, any policy including the policy applicable only between adjacent systems (AS) can be employed for policy routing. Even in the conventional dial-up connection, a RAS is deployed in the ISP, so that each user is connected to the ISP directly in the network layer. Consequently, whether it is significant or not practically, if the RAS is provided with the BGP router function, it is possible to assign another AS number to the dial-up user differently from the ISP one to establish an EBGP session between the user and the ISP.

When building up such a network as ADSL, FTTH, or the like, however, the network is often structured so that each user is not connected to the ISP network directly in the network layer. This is because access line providers that have their own BAS's and Internet service providers (ISP) are often different corporations from each other. Under such circumstances, to realize BGP routing between the BAS of an access line provider and an ISP network, different AS numbers are generally assigned to the BAS and the ISP network. Assignment of such different AS numbers makes it possible for the access line provider and the ISP network to keep their independency in routing management, as well as to apply policy routing between the BAS and the ISP network since the peer session between the BAS and the ISP network is an EBGP session.

Assume now here that a user of ADSL, FTTH, or the like wants to make BGP routing between the user's own network and an ISP network. Such an operation form will often appear if the user network is not a personal/home use one, but a business network used for small enterprises and branch offices of enterprises.

In that case, the user wants to realize policy routing with use of a BGP between the user and ISP networks. Therefore, an AS number is naturally assigned to the user network differently from that of the ISP network. In addition, a BAS, that is, a router comes to be deployed between the edge router of the user network and the edge router of the ISP network. It is thus impossible to establish an ordinary EBGP session between the user network and the ISP network. And, in order to realize policy routing between the user and ISP networks with use of a BGP through an ordinary EBGP session on an ADSL/FTTH line in a conventional network structure, different AS numbers must be assigned to the user network, the BAS and the ISP network and an EBGP session is established between the user network and the BAS, as well as between the BAS and the ISP network respectively. In this network configuration, however, attribute information that passes no AS is not forwarded between the user network and the ISP network. Thus, policy routing that is applicable just between adjacent AS's comes to be disabled.

On the other hand, policy routing is realized between the user network and the ISP network if an EBGP multi-hop session is established between the edge router of the user network and the edge router of the ISP network with use of the EBGP multi-hop session function that is used for EBGP sessions between routers that are not adjacent to each other in the network layer, although the EBGP multi-hop session still arises the following problems of troublesome management/operation, as well as security problems of the network;
1) Routes to both of the user network edge router and the ISP network router need additional configurations such as a static route configuration to their peer router.
2) If such BAS-ISP network configuration items as redundant deployment, IP address change, etc. are changed with respect to the ISP network edge router, the change often comes to affect the configuration of the user network edge router. Therefore, The ISP comes to become difficult to change the configuration of the route between the BAS and the ISP network. And, once the BAS-ISP network configuration is changed, the configuration of the user network edge router must also be updated in accordance with the change.
3) The edge routers of both ISP and user networks cannot determine whether or not the source IP address of a BGP packet received through a BAS is spoofed, so that the edge routers might become a target of the DoS (Denial of Service) attack by receiving a peer session request that uses a spoofed source IP address.

SUMMARY OF THE INVENTION

Under such circumstances, it is an object of the present invention to provide a communication apparatus for enabling policy routing, which includes controls applicable only between adjacent AS's, between each stub AS and an upstream AS without using any EBGP multi-hop session in a communication network constructed typically so as to connect user networks and an ISP network to each other through a BAS, concretely constructed so as to connect one or more stub AS's to one upstream AS that is a transit AS or stub AS through itself (communication apparatus) which functions as a router, as well as a routing method employed for the communication apparatus.

According to the present invention, the routing protocol process for the network layer executed in the communication apparatus behaves as if the communication apparatus belongs to the upstream AS from the standpoint of each stub AS, thereby the AS to which the communication apparatus belongs becomes transparent to each stub AS to solve the above conventional problem. Consequently, the communication apparatus does not use its own AS number or uses the AS number of the upstream AS instead of its own AS number when it is required to notify its own AS number or advertise the attribute information that includes its own AS number to a peer router of a stub AS. Such notification and advertisement are executed in the routing protocol process. In addition, when relaying routing information received from one AS peer router to the other AS peer router, the communication apparatus does not discard the attribute information which is not conventionally passed through an AS to relay the information as is to the other AS peer router.

Hereunder, a description will be made for the outline of the present invention with reference to an example of connecting user networks and an ISP network to each other through the BAS of the present invention. The BAS, when receiving routing information including attribute information added thereto from a user network edge router that is an EBGP peer router, uses the routing information to build up its own routing table, then relays the routing information to a target ISP network edge router that is the other EBGP peer router just like ordinary BGP routers. At that time, however, if the router is an ordinary (conventional) one, the router interprets the attributes (MED attribute, etc.) that are usually not transmitted beyond an AS and does not add the attributes to the routing information when relaying the routing information to the object ISP network edge router. The BAS of the present invention, however, relays such attributes to the ISP network as are. The BAS of the present invention, however, processes other attributes (AS path attribute, next hop attribute, etc.) that are transmitted beyond the AS just like those ordinary (conventional) routers.

The BAS of the present invention, when receiving routing information that includes attribute information added thereto from an ISP network edge router, uses the routing information to build up its own routing table, then relays the routing information to the target user network edge routers just like ordinary BGP routers. At that time, the BAS in this embodiment (of the present invention) interprets the attribute information that includes attributes (MED attribute, etc.) that are not transmitted beyond an AS conventionally by itself just like ordinary routers. When relaying routing information to user network edge routers however, the BAS adds some of the attributes that are not transmitted beyond the AS conventionally to the routing information as are. As for the AS path attribute (recorded in order the AS's are passed by the routing information), the BAS does not discard the routing information even when its own AS number is included in the AS path. Instead, the BAS removes all the AS numbers (or AS numbers included in the set of AS numbers preset in the BAS) from the whole AS path and adds the processed AS path attribute to the routing information without adding its own AS number to the beginning of the AS path. Even as for other attributes that are transmitted beyond an AS, the BAS includes the ISP network AS number in the attribute instead of its own AS number. The BAS thus comes to relay the routing information that includes attribute information generated as described above to the object user network edge routers.

In addition, in the case of the BGP peer session, the BAS notifies the object peer router of its own AS number when a session is established. At that time, however, the BAS notifies the object user network edge router of the ISP network AS number. This is to make the attributes that are usually compared with each other only between the routing information items advertised by the same adjacent AS work effectively like MED attributes, as well as to prevent the router from complicated setting and the routing itself from disorder that might occur at a user site when the private AS number is shown to the user site. The BAS notifies its own AS number to the ISP network edge router.

As described above, realizing the BGP routing according to the method of the present invention, between the user network edge router and a BAS as well as between the BAS and the ISP edge router through the BAS in this embodiment (of the present invention), enables policy routing with use of such attribute information as the MED attributes that are exchanged only between direct adjacent AS's conventionally, between the ISP network and the BAS as well as between the ISP network and the user network, in spite of the presence of the BAS which is located between the user and ISP networks and has an AS number different from any of those of the user and ISP networks. In addition, at that time, neither special functions nor configurations are required in any of the edge routers of both user and ISP networks; ordinary (conventional) BGP routers may be used with ordinary BGP configurations. Particularly, the user network edge router is required for configurations and functions just like the case in which the user network is directly connected to the ISP network to accomplish as same level of policy routing as the case of directly connected networks.

While the present invention assumes a network structure that uses a BAS provided between two networks in a typical embodiment, the functions required for the IP router in this embodiment of the present invention are just a routing function that uses an ordinary BGP protocol and another function added to the BGP processing part of the present invention. Consequently, in addition to the BAS of the present invention as described above, the present invention can also apply to any IP routers corresponding to the network BGP used just like the BAS in this embodiment (of the present invention).

DETAILED DESCRIPTION OF THE PREFERRED EMBODIMENTS

Hereunder, the preferred embodiments of the present invention will be described with reference to the accompanying drawings.

First Embodiment

Figure 1:
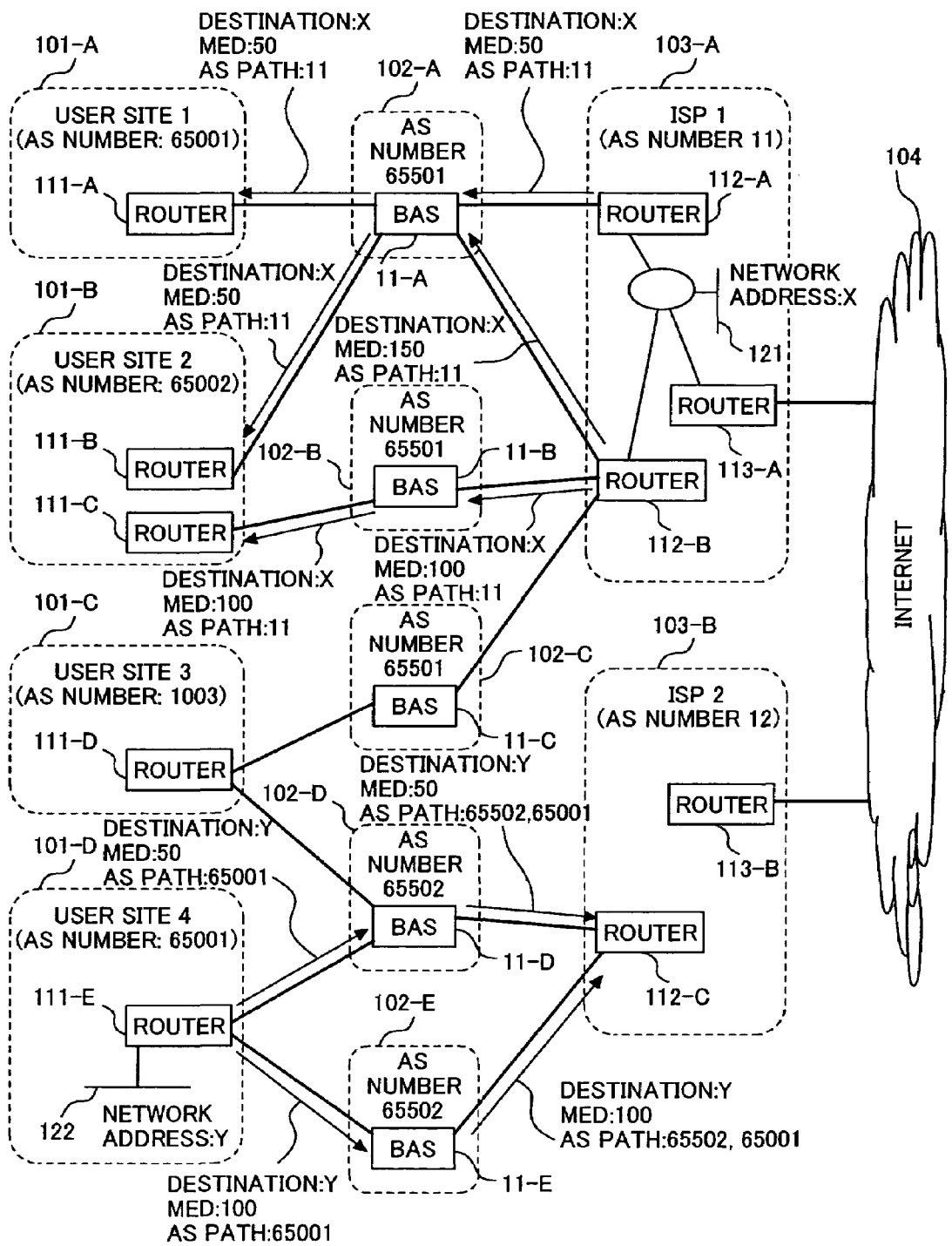
FIG. 1 illustrates a network structure that employs a BGP routing method in the first embodiment of the present invention.

FIG. 1 illustrates a network structure that employs a BGP routing method in the first embodiment of the present invention.

In this first embodiment, BAS's 11-A to 11-E, as shown in FIG. 1, are connected to ISP edge routers 112-A to 112-C through some line interfaces and communication lines (or tunneling lines that look like those communication lines in the network layer). And, as shown in FIG. 1, the BAS's 11-A to 11-E are also connected to user network edge routers 111-A to 111-E through some other line interfaces and communication lines (or tunneling lines that look like those communication lines in the network layer).

In applying the present invention, topology of those communication lines may not be connected as illustrated for the first embodiment if a BAS is deployed between the ISP network and (a single or each of a plurality of) user networks. If one BAS is connected to a plurality of ISP network edge routers, however, those edge routers must always belong to the same AS. In other words, an ISP network to which one BAS is connected just has a single AS. Generally, routers belonging to the same AS also belong to the same ISP. One BAS always comes to be connected to a single ISP network. In this embodiment, it is premised that each of the ISP network 1 103-A and the ISP network 2 103-B has an AS boundary matching with an ISP network boundary. And, the BAS's 11-A to 11-C are connected only to the ISP network 1 103-A and the BAS's 11-D and 11-E are connected only to the ISP network 2 103-B.

The BAS's 11-A to 11-E relay IP packets between the user networks 101-A to 101-D and the ISP networks 103-A and 103-B through those connected lines. In other words, packets forwarded from an ISP network to a user network use the next hop of the ISP network edge routers 112-A to 112-C, which is any of the BAS's 11-A to 11-E and the next hop of the BAS, which is any of the user network edge routers 111-A to 111-E. On the contrary, the packets forwarded from a user network to an ISP network uses the next hop of the user network edge routers 111-A to 111-E, which is any of the BAS's 11-A to 11-E and the BAS next hop, which is any of the ISP network edge routers 112-A to 112-C. A next hop router is a router to which a packet is to be forwarded when the router sends an IP packet to an IP address destination. This next hop router is determined according to the routing information obtained in dynamic exchanges with another router and the routing information configured statically in the router itself.

However, unlike ordinary IP routers, the BAS's 11-A to 11-E do not replay any IP packet from a user network (any of 101-A to 101-D) to another (any of 101-A to 101-D) (such relaying of packets is done through an ISP network) nor relay any IP packet from a line connected to an ISP network (103-A or 103-B) to another line connected to the ISP network (such relaying of packets is done within the subject ISP network). The user networks 101-A to 101-D are all assumed to be stub AS's. In other words, those user networks never relay packets received from outside the user networks (lines connected to BAS's, for example) to outside the user networks through the user network. In other words, each of the user networks never functions as a transit AS.

Each of the user networks 101-A to 101-D, as well as the ISP networks 103-A and 103-B has a unique AS number. The present invention does not limit whether or not the AS number of each of user and ISP networks should be a private one particularly. Such an AS number may be determined as ruled in the ordinary BGP operation method. For example, in this embodiment, because the ISP networks 103-A and 103-B are transit AS's connected to the Internet, they have global AS numbers 11 and 12. And, because the user network 3 101-C is connected to a plurality of ISP networks (so-called a multi-home connection), it has a global AS number 1003. And, because each of other user networks 101-A, 101-B, and 101-D is connected only to a single ISP network, they have private AS numbers 65001, 65002, and 65001 assigned from the ISP.

While the ISP networks 103-A and 103-B are connected to the Internet 104 through upstream edge routers 113-A and 113-B, the present invention can apply to those networks regardless of their connections. An "upstream" in this embodiment means the closer side to the core network from the viewpoint of each of the BAS's 11-A to 11-E. And, an "upstream network" means a network disposed at the upstream of a subject BAS. In FIG. 1, the ISP networks 103-A and 103-B disposed closer to the Internet 104 from the viewpoint of each BAS are upstream networks. On the contrary, the user networks 101-A to 101-D are "downstream networks". If routing information is to be advertised from upstream edge routers 113-A and 113-B to, for example, the Internet existing outside each ISP with use of such an inter-AS routing protocol as the BGP or the like, all the private AS numbers included in the routing information are deleted before the advertisement in ordinary (conventional) BGP operations.

The BAS's 11-A to 11-E are used as AS differently from those of both user and ISP networks. In this first embodiment, each BAS is connected only to a specific ISP network, so that a private AS number is assigned as its own AS number from the connected ISP so as not to be duplicated with any AS number of the user network of the connected ISP. To apply the present invention, an AS number assigned to a BAS must not be duplicated with any of those of user and ISP networks. In addition, if routing information that includes its own AS number is to be flown as is to the upstream of the ISP network, the AS number must be unique in all the AS's connected to the Internet. In ordinary (conventional) operations, however, there is no need to flow the AS number of any BAS to the upstream of the subject ISP network. In this embodiment, therefore, a private AS number is assigned to each BAS. And, when an ISP is to advertise routing information to another AS, such as the Internet, another ISP, or the like to which the private AS number is not assigned under its control, the ISP deletes the private AS numbers from the routing information before the advertisement. Instead of such a private AS number, it is possible theoretically to give each BAS a global AS number that is unique in all the AS's which includes the ISP network, its user networks and all other networks. There is no advantage in that, however.

In this embodiment, the BAS's 11-A to 11-E have EBGP sessions with the user network edge routers 111-A to 111-E and the ISP network edge routers 112-A to 112-C through all the communication lines having a BAS at its one end respectively as shown in FIG. 1. For example, the BAS 11-A has EBGP sessions with the ISP network routers 112-A and 112-B and the user network edge routers 111-A and 111-B. The BAS in this embodiment is also required to function differently from any of ordinary BGP routers for establishing an EBGP session in its initial state. Such an operation of the BAS will be described later.

In this embodiment, the BAS's 11-A to 11-E are handled as physically different cabinets, that is, physical routers. However, because the present invention can apply to those routers if they can be handled independently of each another from the viewpoint of IP routing, the BAS's 11-A to 11-E may be different virtual routers housed in the same BAS cabinet.

Next, a description will be made for how to use the BGP routing method of the present invention in the network structure shown in FIG. 1.

At first, the present invention premises that an AS number is used commonly for all the BAS's deployed under the same ISP. The AS number must be different from any of the AS numbers assigned to other networks except the BAS's deployed under the same ISP (other AS numbers assigned to user networks, etc. under the control of the same ISP when private AS numbers are to be used). In this embodiment, the same private AS number 65501 is used for all of the AS's 102-A to 102-C to which the BAS's 11-A to 11-C belong under the ISP network 1 103-A. Similarly, the same private AS number 65502 is used for all of the AS's to which the BAS's 11-D and 11-E belong under the ISP network 2 103-B. This is because the AS number of the subject BAS itself is deleted from the AS path attribute information added to the routing information to be advertised to the user network edge routers 111-A to 111-E, thereby the user network is permitted to use the MED attribute easily and because all of the routing information items are pretended to be received from the same adjacent AS when they are advertised to the ISP network edge routers 112-A to 112-C, the subject ISP network comes to be able to use the MED attribute easily.

This MED attribute is one of the attributes added to BGP routing information and used to specify a preferential line for IP packet forwarding from one AS to the other when a plurality of lines are used for the connection between two adjacent AS's. A BGP router, when receiving a plurality of routing information items having different MED attribute values and the same IP address prefix from the same adjacent AS, selects a route having the smallest MED attribute value if various routing conditions that should have preference to the MED attribute are the same. For example, while AS1 and AS2 are connected to each other through two lines 1 and 2, if routing information related to the same destination IP address prefix is flown from AS1 to AS2 with an MED attribute value of 50 in the line 1 and 100 in the line 2, the AS2 router uses the line 1 having the smaller MED attribute value (50) to relay the subject IP packet having an IP address matching with the IP address prefix to AS1.

The routing information source AS administrator can determine such MED attribute values freely, so that it is generally meaningless to compare MED attribute values included in routing information items received from different source AS's with each other (except when the source AS's have rules of how to set MED attribute values mutually). Consequently, an ordinary BGP router does not use any MED attribute when selecting a route by making a comparison between routing information items received from different adjacent AS's. When routing information passes an AS so as to be relayed to another AS, the MED attribute is deleted. In that connection, the AS passed by the routing information is required to update the MED attribute value properly as needed.

BAS's used by different ISPs can have the same private AS number or different private AS numbers as long as ISP private AS numbers are used. For example, in this embodiment, the same private AS number 65501 may be used for each of the AS's 102-A to 102-C, as well as 102-D and 102-E.

And, instead of using a common AS number for all the BAS's under the same ISP, some different AS numbers may also be used for some of such BAS's and a set of AS numbers used for all the BAS's may be configured for each BAS. In that connection, when any AS number must be removed from an AS path attribute in routing information to be advertised to a user network, all those AS numbers included in the set of AS numbers are removed collectively from the AS path attribute. When advertising a route to an ISP network, the former AS number is handled as the AS number of the BAS itself. Consequently, for example, if different private AS numbers are assigned to a BAS for housing an ADSL line and a BAS for housing an optical fiber line and the routing information advertised from the latter private AS is handled with priority, the priority can be given to the route passing through the optical fiber line over the route passing through the ADSL line regardless of the MED attribute included in the routing information advertised from the subject user network. In this embodiment, however, unless otherwise notified specially, a common private AS number is used for all the BAS's existing under the same ISP.

Next, a description will be made for how to advertise routing information from a user network to an ISP network. For example, it is assumed here that the edge router 111-E in the user network 4 101-D advertises the routing information related to a route leading to the network 122 having an IP address prefix Y in the user network 4 to the edge router 112-C of the ISP2 103-B finally through EBGP peer sessions with two BAS's 11-D and 11-E. The user network 4 101-D is to advertise the destination Y routing information so that the route through the BAS 11-D is selected with priority for any reason (for example, to keep a band width downward specially for the users of the network 112).

In that connection, the user network edge router 111-E is just required to flow the routing information having a smaller MED value (assumed to be 50 here) for the EBGP session with the BAS 11-D and a larger MED value (assumed to be 100 here) for the EBGP session with the BAS 11-E.

Receiving those routing information items, the BAS 11-D and the BAS 11-E make a check for whether or not the routing information is looped as needed respectively. At that time, in an ordinary BGP process for receiving routing information, each of the BAS's 11-D and 11-E discards the routing information as looped one if its own AS number is included in the AS path attribute of the routing information. In this embodiment, however, the BAS checks whether or not an ISP AS number is included in the routing information instead of its own AS number. Usually, the ISP network edge router 112-C also makes such a check for whether or not routing information is looped using the ISP AS number. Therefore, the BAS 11-D and the BAS 11-E are not always required to make the check. In this embodiment, therefore, the BAS may omit the check of the looping of the routing information received from any of the user network edge routers. A routing information loop means that routing information received by a source router and relayed therefrom to another router is received again by the source router itself. If the source router processes routing information just in the same way as the last time, the same routing information comes to be sent repetitively, thereby the routing information might increase limitlessly. To avoid such a problem, each BAS generally makes a routing information loop check and if such a loop is detected, the BAS discards the routing information.

If no check is made for routing information loop or routing information is found not to be looped, the BAS updates its own routing table with the received routing information, then processes the AS path attribute, the next hop attribute, etc. set in the routing information just like ordinary BGP routers to create routing information to be advertised to the ISP network edge router 112-C. While the BAS does not add the MED attribute value included in the original routing information to the newly created routing information in ordinary BGP route advertisement processings, it is added in the routing information advertisement processing according to the present invention. As for the AS path attribute, the BAS is just required to add its own AS number to the beginning of the AS path so as to be added to the newly created routing information just like ordinary BGP routers. If it is expected that a user network might advertise routing information in which an illegal private AS number is included in the AS path attribute, the BAS may delete only its own AS number (or all AS numbers included in the set of AS numbers if the set of AS numbers used in all BAS's under the same ISP is preset in the BAS) from the whole AS path so as to avoid confusion of the routing that might occur in the subject ISP before adding its own AS number to the beginning of the AS path. The routing information that includes attribute information generated as described above is then advertised to the ISP network edge router 112-C.

Consequently, the ISP network edge router 112-C comes to receive two routing information items about the same destination Y from the BAS's 11-D and 11-E. The two advertised routing information items are advertised from the same adjacent AS 65502, have the same AS path attribute length and different MED attribute values. After that, the ISP network edge router 112-C selects the routing information received from the BAS 11-D as a proper route just like the ordinary BGP route selection processing, since the information has a smaller MED attribute value. As a result, a packet having a destination IP address matching with the IP address prefix Y is received by the user network edge router 111-E from the ISP network edge router 112-C through the BAS 11-D as long as no error occurs in any of the BAS 11-D and the path passing through the BAS 11-D.

If the BAS 11-D is an ordinary BGP router, the routing information received from the user network edge router 111-E is advertised not only to the ISP network edge router 112-C, which is a peer router of an EBGP session with the BAS, but also to the user network edge router 111-D, which is a peer router of an EBGP session with the BAS unless the BAS 11-D is configured to filter routing information. However, the BAS 11-D, when it is employed in this embodiment, is premised not to relay any packets received from any user network to another user network through itself, so that the BAS 11-D never advertises routing information received from the user network edge router 111-E to the user network edge router 111-D.

Next, a description will be made for how to advertise routing information from an ISP network to a user networks. For example, it is assumed here that the edge routers 112-A and 112-B of the ISP network 1 103-A advertise routing information related to a route leading to the network 121 having an IP address prefix X in the ISP network finally to the edge router 111-A of the user network 1 101-A and the edge routers 111-B and 111-C of the user network 2 101-B through EBGP session with the two BAS's 11-A and 11-B. And, it is also assumed here that the ISP1 103-A desires to advertise the routing information having the destination X so that the route is selected preferentially so as to go through a pair of the BAS 11-A and the ISP network edge router 112-A, a pair of the BAS 11-B and the ISP network edge router 112-B, and a pair of BAS 11-A and the ISP network edge router 112-B sequentially in order for any reason (for example, according to the network topology in the ISP network, the ISP network edge router 112-A is closer to the network 121 than the ISP network edge router 112-B and the line between the BAS 11-A and the ISP network edge router 112-B is a backup slow speed one).

In that connection, the ISP network edge router 112-A is just required to flow routing information having a smaller MED attribute value (assumed to be 50 here) for the EBGP session with the BAS 11-A, the ISP network edge router 112-B is just required to flow routing information having a larger MED attribute value (assumed to be 150 here) for the EBGP session with the BAS 11-A and routing information having an intermediate MED attribute value (assumed to be 100 here) for the EBGP session with the BAS 11-B.

Each of the BAS's 11-A and 11-B receiving those routing information items in this embodiment does not make any check for whether or not the routing information is looped, although the check is done when receiving routing information in each ordinary BGP. And, each of the BAS's 11-A and 11-B updates its own routing table with the received routing information. At that time, the BAS 11-A receives two routing information items from the ISP network edge routers 112-A and 112-B. The routing information items have the same source of advertisement, which is an adjacent AS 11, the same AS path attribute length, different MED attribute values, and the same destination X. The BAS 11-A thus selects the routing information received from the ISP network edge router 112-A as a proper route according to the ordinary BGP route selection processing, since the information has a smaller MED attribute value.

After that, each of the BAS's 11-A and 11-B updates its own routing table with the selected routing information, then processes the next hop attribute, etc. included in the routing information just like ordinary BGP routers to create routing information to be advertised to the user network edge routers 111-A to 111-C. While each of those BAS's 11-A and 11-B does not add the MED attribute value included in the original routing information to the newly generated routing information in ordinary BGP route advertisement processings, the BAS comes to add that to the newly generated routing information in the route advertisement processing according to the present invention. In addition, as for the AS path attribute, the BAS just adds its own AS number to the beginning of the AS path when in any of ordinary BGP route advertisement processings. In the BGP route advertisement processing according to the present invention, the BAS just deletes its own AS number from the whole AS path (if a set of AS numbers used in all the BAS's under the same ISP is preset in the BAS, all the AS numbers included in the set of AS numbers are to be deleted) and does not add its own AS number to the beginning of the AS path and the BAS adds the newly generated AS path to the newly generated routing information. The BAS then advertises the routing information that includes attribute information generated as described above to the user network edge routers 111-A to 111-C.

The user network edge routers 111-A to 111-C thus come to receive a piece of routing information having the destination X respectively from the BAS 11-A or 11-B. At that time, all the advertisement source adjacent AS numbers look like 11, that is, all of the adjacent AS's look like the ISP from the standpoint of the edge routers 111-A to 111-C. And, because 65501 is the AS number for both of the BAS's 11-A and 11-B, if this AS number is used to establish a peer session with the user network edge routers 111-A to 111-C according to the ordinary BGP processing method, an inconsistency might occur between the AS number notified by the BAS when the session is established and the AS number included in the routing information. However, this problem is solved if the BAS in this embodiment is used for establishing the peer session (to be described later).

Therefore, if a packet received from the user network edge router 111-A has a destination IP address matching with an IP address prefix X, it comes to be received by the ISP network edge router 112-A through the BAS 11-A unless an error occurs in the line between the BAS 11-A and the ISP network edge router 112-A and in the ISP network edge router 112-A itself. As for the user network edge routers 111-B and 111-C, if an IBGP session is established between those routers, routing information received by one of the routers from a BAS is advertised to the other router and those routing information items are processed by an ordinary BGP route selection processing so that the route advertised from the BAS 11-A is selected finally since it has a smaller MED attribute value. As a result, a packet received from the user network 2 101-B and having a destination IP address matching with an IP address prefix X is received by the ISP network edge router 112-A through the BAS 11-A from the user network edge router 111-B unless an error occurs in any of the route line, the BAS, and the router.

If the BAS 11-A is an ordinary BGP router, the routing information received from the ISP network edge router 112-A is advertised not only to the user network edge routers 111-A and 111-B, which are peer routers, but also to the ISP network edge router 112-B, which is a peer router unless the BAS 11-A is configured to filter routing information. However, if the BAS 11-A is a BAS employed in this embodiment, the BAS 11-A is premised not to relay packets from an ISP to another line leading to the same ISP through a BAS, so that the BAS 11-A never advertises the routing information received from the ISP network edge router 112-A to the ISP network edge router 112-B. Similarly, the BAS 11-A never advertises the routing information received from the ISP network edge router 112-B to the ISP network edge router 112-A.

As described above, if a BAS is used in this embodiment according to the BGP routing method of the present invention, policy routing that uses MED attributes that are not notified through any AS can apply between a user network and an ISP network through a BAS having an independent (unique) AS number. The edge routers of the user and ISP networks used in this embodiment may be ordinary standard configured BGP routers.

Figure 2:
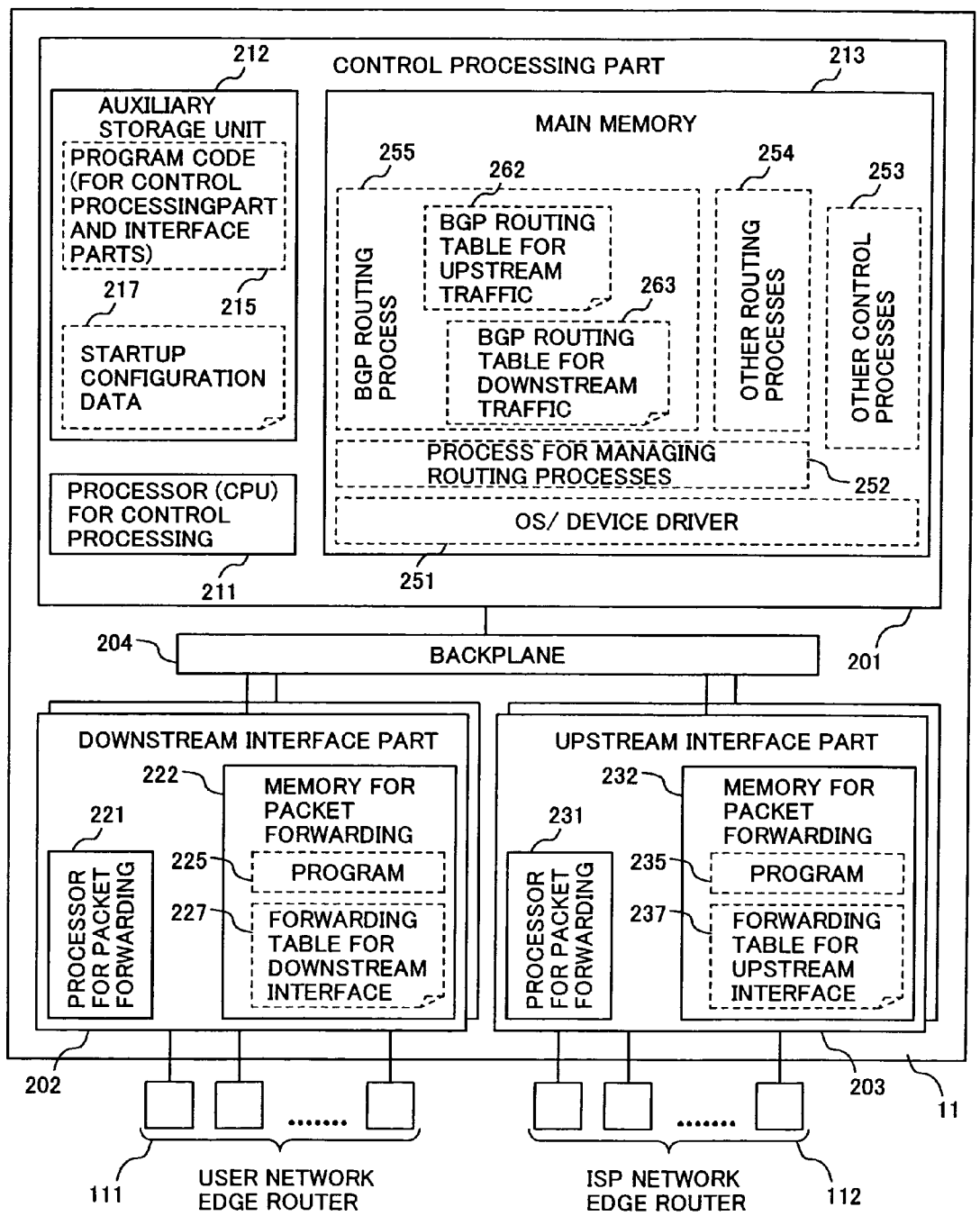
FIG. 2 illustrates an internal processing architecture that satisfies the functions of a BAS in the first embodiment of the present invention.

FIG. 2 illustrates an example of an internal processing architecture that can satisfy the functions of the BAS in this embodiment.

The present invention premises that packets are not relayed directly from a user network to another and from a line connected to an ISP network to another line. In addition, the present invention rules contents of the processings executed by the BAS employed in this embodiment as differences from those of the ordinary BGP routing as described above. However, the internal processing architecture of the BAS in this embodiment may be any one if it satisfies the above BAS functions; the architecture is not limited necessarily only to that shown in FIG. 2.

In the architecture example shown in FIG. 2, the BAS 11 in this embodiment is constructed by four internal hardware modules: a control processing part 201, a downstream interface part 202, an upstream interface part 203, and a backplane 204. The elements enclosed by a solid line in FIG. 2 are hardware items while the elements enclosed by a dotted line are software items or data items (table etc.).

The BAS 11 includes one or more downstream interface parts 202. The downstream interface part 202 includes one or more interfaces for connecting a line to a user network edge router 111 respectively. The downstream interface part 202 includes internal hardware items that are a packet forwarding processor 221 and a forwarding memory 222. The forwarding memory 222 retains a program 225 and a downstream interface forwarding table 227. The downstream interface forwarding table 227 retains a correspondence table used, when receiving a packet from the user network edge router 111, to determine the ISP edge router 112 that is the packet's forwarding destination and the upstream interface part 203 according to the destination IP address of the packet (however, if the destination IP address is the address of the BAS 11 itself, the control processing part 201 is determined as the destination). The information in the downstream interface forwarding table 227 is updated by the control processing part 201 of the BAS 11 as needed. The program 225 (a program code) is loaded from an auxiliary storage unit 212 provided in the control processing part 201 when the BAS 11 is started up. The packet forwarding processor 221 executes the program 225 to determine the destination of the packet received from the user network edge router 111 properly with reference to the downstream interface forwarding table 227 and forwards the packet to the destination through the backplane 204. The packet forwarding processor 221 executes the program 225 to send the packet received from the backplane 204 to the user network edge router 111 properly.

The BAS 11 also includes one or more upstream interface parts 203 in itself. The upstream interface part 203 includes one or more interfaces for connecting a line to the ISP network edge router 112 respectively. The upstream interface part 203 includes internal hardware items that are a packet forwarding processor 231 and a forwarding memory 232. The forwarding memory 232 retains a program 235 and an upstream interface forwarding table 237. The information retained in the upstream interface forwarding table 237 and the processing contents of the packet forwarding processor 231 are completely the same as those in the downstream interface forwarding table 227 and the packet forwarding processor 221 except that the upstream and the downstream, as well as the user network and the ISP network are replaced with each other in position.

The BAS 11 connects the control processing part 201 and the upstream interface part with each other, the control processing part and the downstream interface part with each other, and the upstream interface part and the downstream interface part with each other through the backplane 204 provided in itself.

The control processing part 201 provided in the BAS 11 processes a routing protocol and IP packets received by itself and sent therefrom, as well as manages the whole BAS 11. The control processing part 201 includes internal hardware items that are a processor (CPU) for control processing 211, an auxiliary storage unit 212, and a main memory 213. The auxiliary storage unit 212 retains a program code 215 and startup configuration data 217. The program code 215 is composed of a program code for the control processing part and a program code for the interface parts. Each of the codes is loaded into its corresponding memory (main memory 213 or forwarding memory 222/232) when the BASS 11 is started up and executed in its corresponding processor (processor for control processing 211 or packet forwarding processor 221/231). The startup configuration data 217 includes various types of information configured by the administrator in the BAS 11 and read by the processor for control processing 211 when the BAS 11 is started up or the operation is specified by the administrator, then configured in each unit/part provided in the BAS 11 according to the content of the configuration data. The configuration data retained in the startup configuration data 217 includes the AS number of the BAS 11 itself, the ISP network AS number, each interface IP address configuration, each peer router IP address, static routing configuration, etc.

The program code for control processing to be loaded into the main memory 213 and executed by the processor (CPU) for control processing is divided into an OS/device driver 251, a process for managing routing processes 252, a BGP routing process 255, other routing processes 254, and other control processes 253. The OS/device driver 251 supplies such various basic processing functions as process management, input/output processings, TCP/IP protocol processings, etc. to each process. The other control processes 253 execute processings related to those other than routing, for example, device management, tunneling protocol, etc. The other routing processes 254 execute processings related to various routing protocol other than the BGP. The process for managing routing processes 252 collects routing information obtained from the BGP routing process 255 and other routing processes 254, as well as static route information configured by the administrator to generate data for the upstream/downstream interface forwarding tables 227 and 237 to transmit the data to the upstream/downstream interface parts 202 and 203.

The BGP routing process 255 is obtained by updating the standard BGP processing process with the open message processing to be executed for the user network edge router 111 and the attribute information processing to be executed for the BGP routing information received from the user network edge router 111 and ISP network edge router 112 according to the present invention. In other words, this BGP routing process 255 is a software process provided with functions based on the inter-AS routing method of the present invention for notifying an own AS number to a peer router through an open message and mutually notifying routing messages with a peer router. The BGP is a protocol executed over the TCP. However, the BGP routing process is provided only with functions related to the BGP itself. Therefore, the OS/device driver 251 provided with a TCP/IP protocol stack processes protocols of the TCP and under.

The BGP routing process 255 includes a BGP routing table used for upstream traffic 262 and a BGP routing table for downstream traffic 263 in itself. The BGP routing process 255 updates the BGP routing table for upstream traffic 262 according to a routing message received from the ISP network edge router 112 and advertises the updated portion of the routing message to the user network edge router 111. The process for managing routing processes 252 updates the forwarding table for downstream interface 227 with the updated portion of the BGP routing table for upstream traffic 262. The BGP routing process 255 updates the BGP routing table for downstream traffic 263 according to a routing message received from the user network edge router 111 and advertises the updated portion of the routing message to the ISP network edge router 112. The updated portion of the BGP routing table for downstream traffic 263 is used to update the forwarding table for upstream interface 237 through the process for managing routing processes 252.

The BAS 11 in this embodiment, when receiving a BGP routing message addressed to itself from any of the user network edge routers 111, passes the message to the downstream interface part 202, the backplane 204, the OS/device driver 251 provided in the control processing part 201, and passed finally to the BGP routing process 255. The BGP routing process 255 processes the message according to the inter-AS routing method of the present invention, updates the BGP routing table for downstream traffic 263, and updates the forwarding table for upstream interface 237 with the updated portion through the process for managing routing processes 252. The BGP routing process 255 then generates a routing message for advertising the updated portion of the routing information to the ISP network edge router 112, then advertises the message to the ISP network edge router 112 through the OS/device driver 251, the backplane 204, and the upstream interface part 203.

When receiving a BGP routing message addressed to itself from any of the ISP network edge routers 112, the BGP routing process 255 processes the message in the same processing flow (up and down, upstream and downstream, ISP network and user network are replaced with each other in order), updates the BGP routing table for upstream traffic 262 and forwarding table for downstream interface 227, then advertises the routing message to each user network edge router 111.

Figure 3:
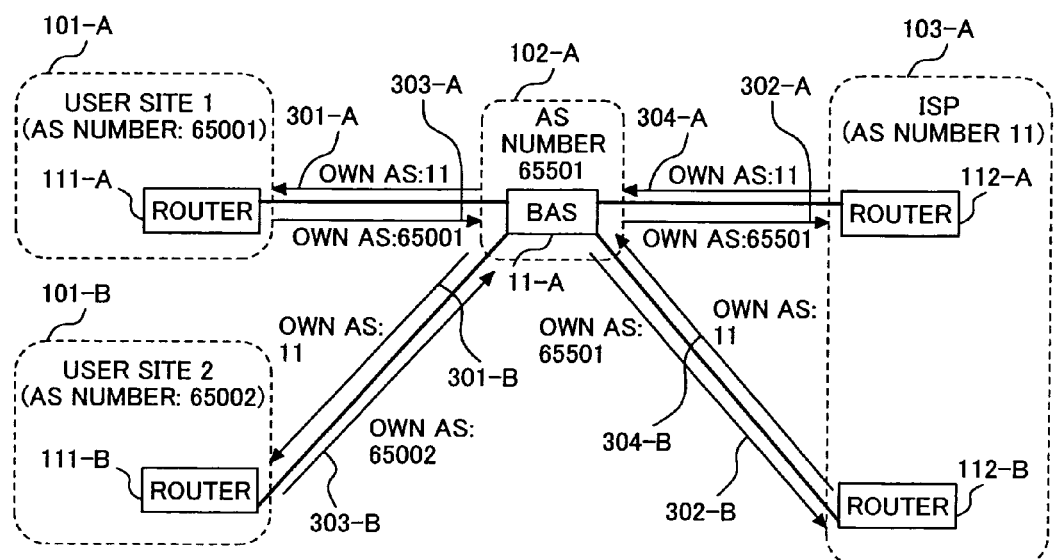
FIG. 3 illustrates open messages exchanged in a peer session established according to the BGP routing method of the present invention in part of the network structure in the first embodiment of the present invention.
Figure 4:
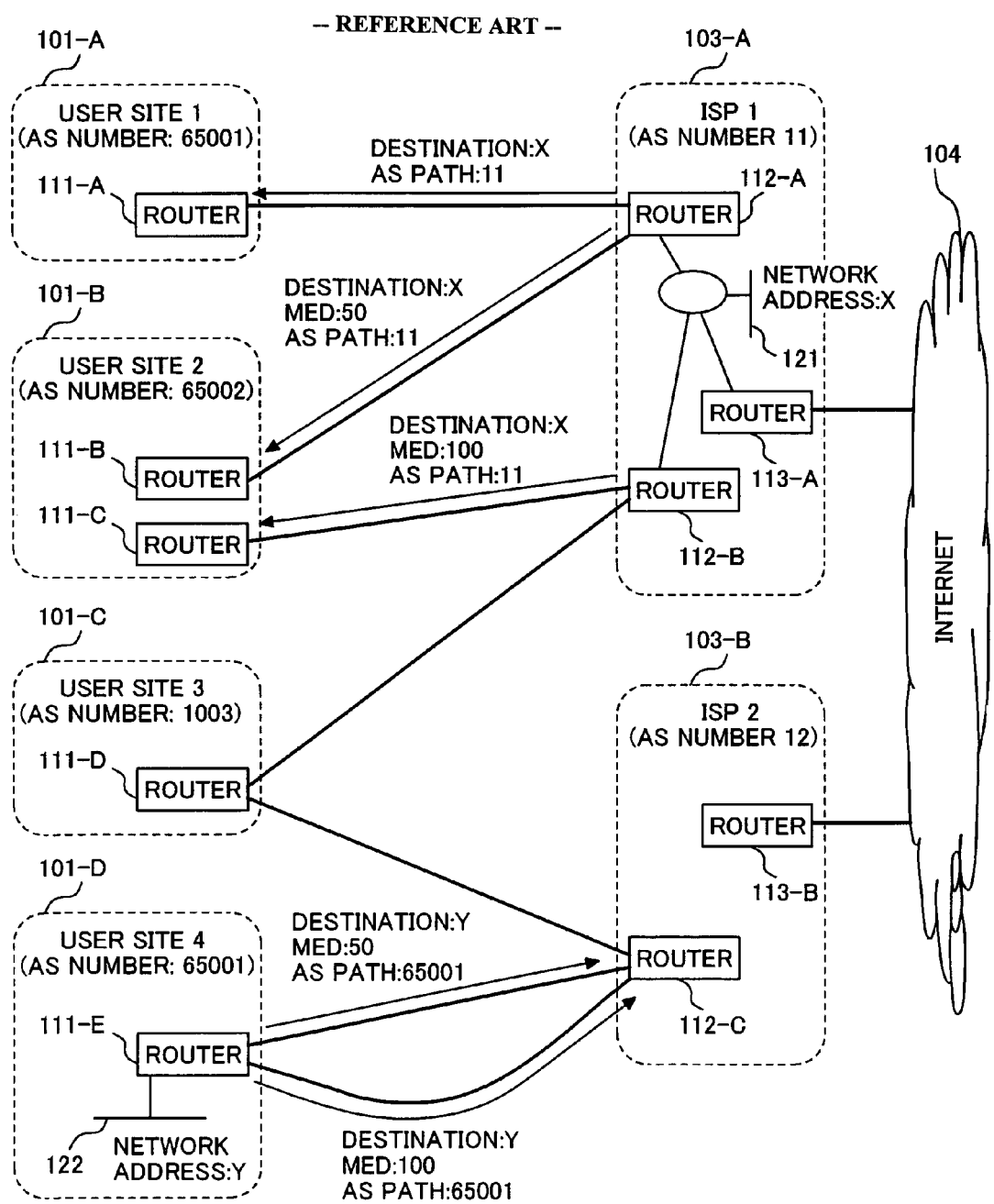
FIG. 4 illustrates a network structure between a user network and an ISP network using conventional enterprise access lines and a conventional BGP routing method employed for the network structure.

FIG. 3 illustrates open messages issued when a peer session is established in part of the network structure in the first embodiment according to the BGP routing method of the present invention.

A peer session establishing process executed by the BAS in this embodiment is completely the same as a peer session establishing process executed by an ordinary BGP processing method except for the notification of its own AS number of the BAS included in the open message. And naturally, a peer session establishing process executed by a user/ISP network edge router may be the same as that executed by an ordinary BGP processing method including the notification of its own AS number of the router included in the open message. While only the BAS 11-A in this embodiment is described here, other BAS's in this embodiment can execute the following processings similarly.

The BAS 11-A sets the own AS number field of the subject BGP open message to its own AS number 65501 just like ordinary BGP processings, then sends the message (302-A/302-B) to the ISP network edge routers 112-A and 112-B. On the other hand, the BAS 11-A sets the own AS number field of the subject BGP open message to the ISP AS number 11 unlike ordinary BGP processings, then sends the message (301-A/301-B) to the user network edge routers 111-A and 111-B.

As described above, each of the ISP edge routers 112-A and 112-B, as well as the user network edge routers 111-A and 111-B sets the own AS number field of the subject BGP open message to its belonging AS number just like ordinary BGP processings and sends the messages (303-A/B, 304-A/B) to the BAS.

If a peer session is established according to such an open message, no conflict will occur between the AS number received when the peer session is established and the AS number included in the AS path attribute set in the received routing information in the user network even though the routing information is exchanged by the method described in FIG. 1. And, because the AS number of the BAS can be hidden completely from the user network, the user network comes to regard the peer session as a direct one with the AS of the ISP network.

Next, a description will be made for a problem that might occur in the process for controlling BGP routing information with no modification of the BAS with reference to FIGS. 5 and 6. The award of priority of the present invention will also be described together here.

Figure 5:
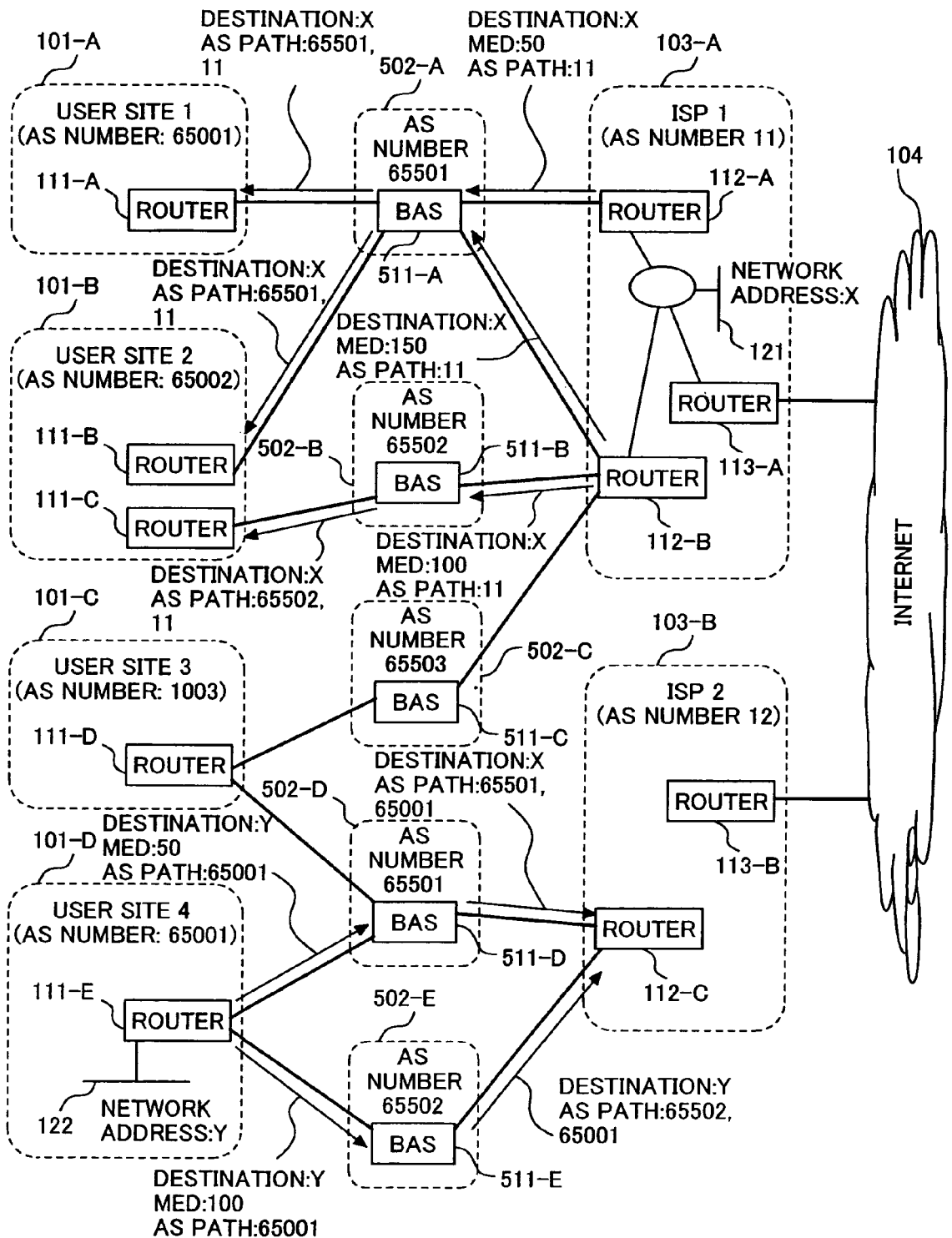
FIG. 5 describes BGP routing operations when a conventional BGP router that does not use the BGP routing method of the present invention as a BAS in the same network structure as that in the first embodiment of the present invention.

FIG. 5 illustrates how the BGP routing is to be realized with use of a conventional BGP router as a BAS in the same network configuration as that in the first embodiment.

In a conventional personal ADSL/FTTH access network, the network configuration is expected to become as shown in FIG. 5 when the BAS is provided with the conventional BGP routing method and the business user network is formed so as to employ the BGP routing method without using the ENGP multi-hop session function.

Each of the servers (BAS) 511-A to 511-E is assigned a private AS number unique in the connected ISP networks 103-A and 103-B. For example, the servers (BAS) 511-A to 511-C, which are all connected to the ISP network 1 103-A, are assigned different unique AS numbers 65501, 65502, and 65503 respectively. This is to avoid the following problem that might occur if the same AS number is assigned to a plurality of servers (BAS) connected to the same ISP network; when one BAS receives routing information from a user network and relays the routing information to the other BAS through an ISP network while the same AS number as its own one is included in the AS path attribute of the routing information, the BAS regards the routing information as looped one, thereby the BAS discards the information. The BAS in this embodiment, however, does not discard the routing information and deletes its own AS number from the AS path to avoid such a problem.

Assume now that routing information to lead to a network having an address prefix X is advertised so that the subject packet is sent to the user network edge routes 111-A to 111-C through the servers (BAS) 511-A and 511-B from any of the ISP network edge routers 112-A and 112-B similarly to the case shown in FIG. 1. At that time, just as shown in FIG. 1, the routing information to be advertised from the ISP network edge routers 112-A to the BAS 511-A is assumed to have 50 as the MED attribute value, the routing information to be advertised from the ISP network edge router 112-B to the BAS 511-A is assumed to have 150 as the MED attribute value, and the routing information to be advertised from the ISP network edge routers 112-B to the BAS 511-B is assumed to have 100 as the MED attribute value. Both of the servers (BAS) 511-A and 511-B receive those MED attributes. However, the servers (BAS) 511-A and 511-B are BGP routers employing the conventional routing method and having AS numbers different from those of the user network edge routers 101-A and 101-B, so that those servers (BAS) 511-A and 511-B do not relay any MED attribute to the user network edge routers 111-A to 111-C. The MED attributes advertised by the ISP network are thus validated between the ISP network and the object BAS while it is not validated between the ISP network and the object user network. In other words, when the BAS 511-A forwards an IP packet having an IP address matching with the address prefix X to an ISP network, the BAS forwards the IP packet to a line of the ISP network edge router 112-A having a smaller MED attribute. The MED attribute is not useful at all to determine which user edge router (user edge router 111-B or 111-C) and BAS (511-A or 511-B) should be selected to forward an IP packet received from the user network 2 101-B to the ISP network 1 103-A.

Even when the BAS 511-A/B modifies the MED attribute so as to relay it, the user network 2 regards the routing information received by the user edge router 111-B from the BAS 511-A and the routing information received by the user edge router 111-C from the BAS 511-B as different information items received from different adjacent autonomous systems (AS). Therefore, unless the user network edge routers 111-B and 111-C are set specially so as to compare the MED attributes with each other even when those attributes are included routing information items received from different adjacent systems (AS), the MED attributes are not used for selecting a proper route as a result of comparison between those two routing information items by those routers. However, the BAS in this embodiment (of the present invention) avoids the above problem by relaying the MED attribute to the object user network and making the user network regard that the BAS belongs to the AS of the ISP network.

Similarly, such MED attributes are also used between a user network and a BAS even when advertising routing information related to a route leading to the network having the address prefix Y to the ISP network edge router 112-C through the servers (BAS) 511-D and 511-E corresponding to the conventional BGP, although the MED attributes do not work between the user network and the ISP network. However, the BAS in this embodiment avoids the above problem by assigning the same AS number to all the servers (BAS) for relaying MED attributes at the downstream of the same ISP network.

The user network 3 101-C establishes multi-home sessions with a plurality of ISP networks, so that the ISP networks 103-A and 103-B are required to hide the private unique AS numbers assigned independently to the ISPs from the user network 3 101-C (otherwise, a problem might occur in the routing in the user network 3). Many routers are provided with a function for deleting all private AS numbers from the subject AS path attribute when advertising routing information respectively. It is expected therefore that the servers (BAS) 511-C and 511-D corresponding to the conventional BGP can also delete all the private AS numbers from the subject AS path attribute when advertising routing information to the user network edge router 111-D. Each of the servers (BAS) 511-C and 511-D, however, uses a private AS number as its own AS number and the AS number comes to be included in each open message sent therefrom to a user network edge router when a peer session is established. And, even when the BAS is set so as to delete all the private AS numbers from the subject AS path attribute, the router's own AS number must always be added to the AS path attribute, although it depends on whether or not the BAS is provided with the BGP routing function. The BAS in this embodiment (of the present invention) will never arise such a problem even when a private AS number is assigned to itself.

Figure 6:
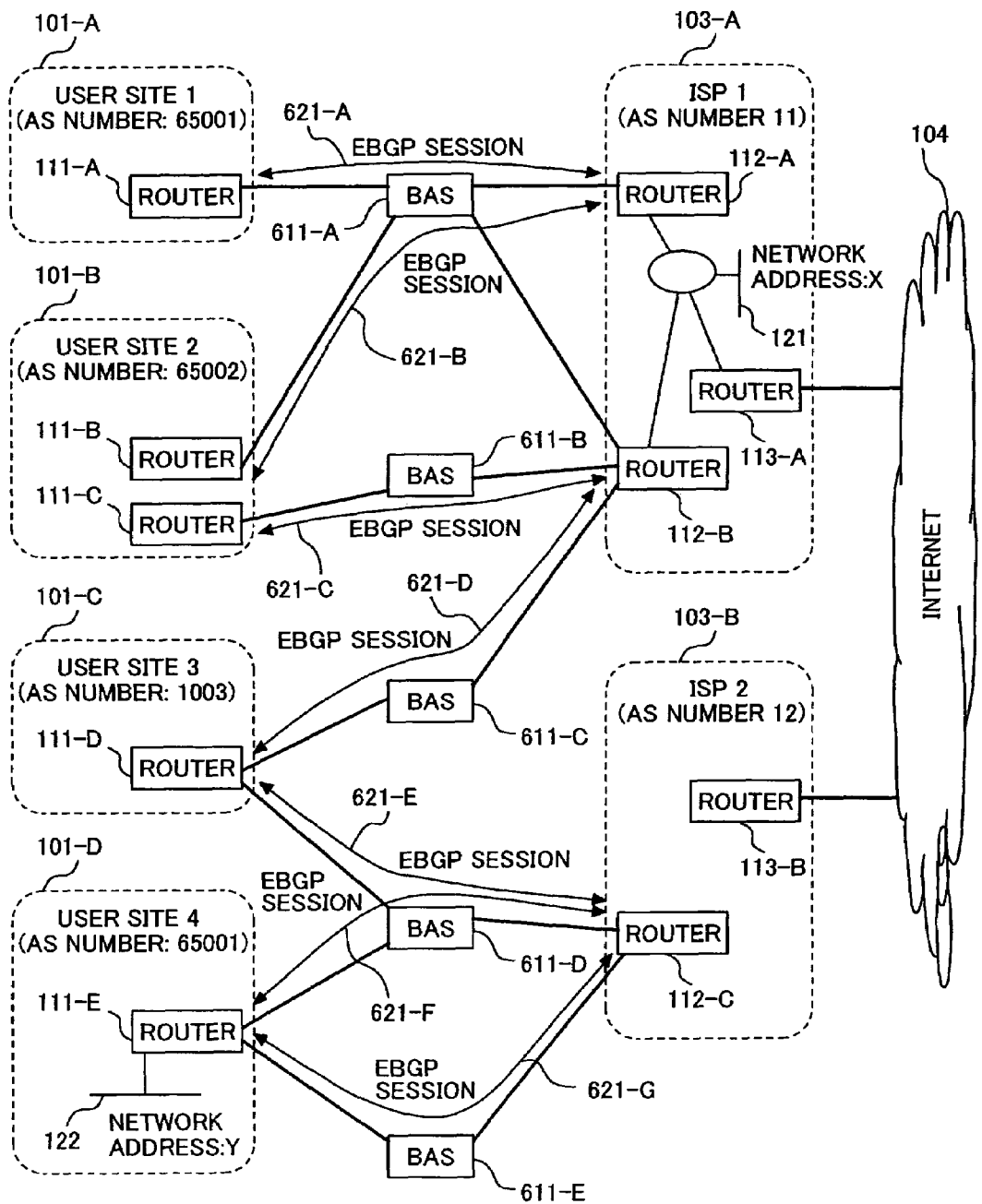
FIG. 6 illustrates a form of an EBGP multi-hop session established in the same network structure as that in the first embodiment of the present invention while BGP routing is done in the EBGP multi-hop session between the subject user and ISP networks so as not to use any BAS in the BGP routing.

FIG. 6 illustrates how an EBGP multi-hop session is established between a user network and an ISP network for enabling BGP routing in a network configuration similar to that in the first embodiment, although the network is formed so as to reject participation of each BAS in the BGP routing.

As described above, the EBGP multi-hop session function is used to establish an EBGP session between routers in a network layer, that is, between routers that are not adjacent to each other in the IP layer. In a conventional personal ADSL/ETTH access network, if the EBGP multi-hop session function is used to connect a business user network that employs the BGP routing method, the network configuration is expected to become as shown in FIG. 6.

And, using the EBGP multi-hop session function as described above makes it possible to establish an EBGP multi-hop session 621 between a user network and an ISP network as shown in FIG. 6 regardless of whether or not a BAS is provided between those networks. And, such an established EBGP multi-hop session 621 enables policy routing between adjacent autonomous systems (AS) just like ordinary (conventional) EBGP sessions.

The BAS 611 relays IP packets and BGP routing messages that are not addressed to itself between the user network edge router 111 and the ISP edge router 112. However, because the BAS 611 does not make BGP routing, it never sends BGP routing messages from itself and discards all the BGP routing messages addressed to itself. However, when enabling policy routing between the BAS 611 and the ISP network edge router 112, the BAS 611 may be used as a BGP router and an EBGP session may be established between the ISP network edge router 112 and the BAS 611 separately from the illustrated EBGP multi-hop session 621. In FIG. 6, there is no EBGP session established between the ISP network edge router 112 and the BAS 611.

Therefore, if the EBGP multi-hop session function is used as described above, it seems very easy to satisfy the requirement for enabling BGP policy routing between user and ISP networks. And, nevertheless, there are still some problems that must be solved to enable the EBGP multi-hop session function.

One of the problems is that routing information up to the object peer router must be preset by any means so as to enable an EBGP session between routers that are not connected to each other directly. Otherwise, the EBGP peer session itself cannot be established. For example, because the user edge router 111-B is connected to the BAS 611-A directly through a line, the route between the router 111-B and the BAS 611-A is clear. However, the router 111-B is not connected to the ISP network edge router 112-A directly, so that the router 111-B is not sure about which line should be used to send a subject IP packet to the ISP network edge router 112-A to establish a BGP peer session unless the router 111-B must be given the routing information beforehand, for example, statically. To avoid such a problem, it is required to preset a static route to the ISP network edge router 112-A in the user network edge router 111-B.

The second problem is that if the configuration of a network between a BAS and an ISP network edge router is changed, the setting of the user network edge router must also be often changed. For example, if a line is provided newly for the connection between the BAS 611-A and the ISP network edge router 112-B and the configuration of the network is changed as shown in FIG. 6, two lines have come to be used redundantly between the BAS 611-A and the ISP network 1 103-A. However, both of the user network 1 101-A and the user network 2 101-B cannot have any advantage to use those two lines. This is because there are only the peer sessions 621-A and 621-B established between the user network and the ISP network through the BAS 611-A and one of the peer routers used for the sessions is the ISP network edge router 112-A. Consequently, if the ISP network edge router 112-A stops, the user network comes to loose information about routes outside the subject AS obtained through the BAS 611-A. To avoid such a problem, an EBGP multi-hop session is required to be established between each of the user network edge routers 111-A and 111-B and the ISP network edge router 112-B through the BAS 611-A. And, to achieve this, enabling a new EBGP multi-hop session must be set for not only the ISP network edge router 112-B, but also for the user network edge routers 111-A and 111-B.

The third problem is security problems to occur from IP packet source address spoofing. Generally, a source host can set a value of the source IP address included in the header of each IP packet freely and the value does not affect any IP packet to be forwarded to the destination host. This is why a false value can also be set in the source IP address field. In the case of the ordinary EBGP session established through a directly connected line, the true source host of each BGP packet is limited just to any of the hosts existing on the direct line, so that the source IP address spoofing is detected easily. On the other hand, there is no peer router for any EBGP multi-hop session on such a direct line, so that such source IP address spoofing cannot be detected. For example, assume that the user network edge router 111-B sends a BGP packet to the ISP network edge router 112-A according to a source IP address spoofed so as to be addressed to the user network edge router 111-A in FIG. 6. At that time, the ISP network edge router 112-A, when receiving the BGP packet, cannot tell whether the packet is received really from the user network edge router 111-A or from another host according to a false source IP address. This is why if a TCP connection/disconnection packet is sent to a TCP port from a third host other than the peer router, a DDoS attack or unexpected peer connection/disconnection might occur.

And, this is why if an EBGP multi-hop session is used between a user network and an ISP network for BGP routing as described above, the above problem arises newly. On the other hand, the BGP routing method of the present invention never causes any of such problems to arise.

Figure 7:
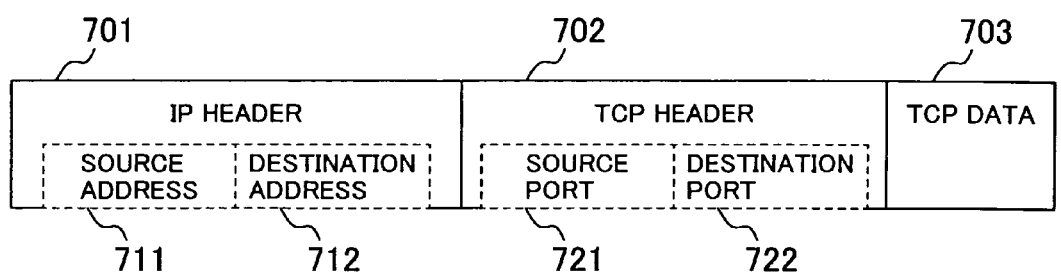
FIG. 7 is a structure of the data in a BGP packet.

FIG. 7 illustrates a structure of the data in a BGP packet.

A BGP packet means an IP packet that includes control information for a TCP session used to exchange BGP messages between peer routers or data to be sent/received through a TCP session.

The IP header 701 includes such information as source address 711, destination address 712, etc. as ruled by the IP protocol standard. In the BGP packet, a peer router IP address is written in the field of the destination address 712. Usually, there are two versions used for the IP protocol; version 4 (IPv4) and version 6 (IPv6). Any of the two versions may be used for the embodiment of the present invention. And, a layer 2 header that depends on the line type is usually added to each IP packet just before its IP header. The present invention does not depend on any of the line type and the layer 2 header format.

Following the IP header is written a TCP header 702. The TCP header 702 includes such information as source port 721, destination port 722, etc. as ruled by the TCP protocol standard. The source port 721 is a TCP port number used by a BGP packet source BGP router for a peer session. The destination port 722 is a destination of the subject BGP packet, that is, a TCP port used by the peer router for a peer session. A TCP connection used for a peer session is provided upon a request from one peer router (with any source port number) to the peer session accepting port of the other peer router. A 179th port specified as a BGP standard TCP port is usually used as this peer session accepting port. The present invention enables other numbers to be used, however.

The TCP data includes 0 or one or more BGP messages partially or wholly. A BGP message that flows in a TCP connection stream is not necessarily included in the TCP data 703 of an IP packet. For example, the TCP data 703 in an IP packet may include a plurality of BGP messages and the TCP data 703 in an IP packet may include only part of one BGP message.

A BGP router distinguishes between ordinary communication packets and BGP packets according to the destination address 712 and the destination port 722 of each IP packet. Hereinafter, such a structure of a BGP packet will be described according to the BAS internal architecture in this embodiment shown in FIG. 2. Each of the interface parts 202 and 203, when receiving an IP packet from an external interface, checks whether or not the destination address 712 matches with its own IP address. If the check result is YES (match), the interface part 202/203 sends the IP packet to the control processing part 201. If the check result is NO (not match) and the target interface is found, the interface part 202/203 sends the IP packet through the external interface. If the target interface is not found, the interface part 202/203 discards the IP packet. The OS/device driver 251 provided in the control processing part 201, when receiving an IP packet addressed to itself, checks whether or not the received IP packet is a TCP packet. If the check result is YES (TCP packet), the OS/device driver 251 then checks whether or not the port number opened by the BGP routing process 255 for peer sessions matches with the destination port 722 of the IP packet. If the check result is YES (match), the driver 251 passes the data 703 of the IP packet to the BGP routing process 255.

Figure 8:
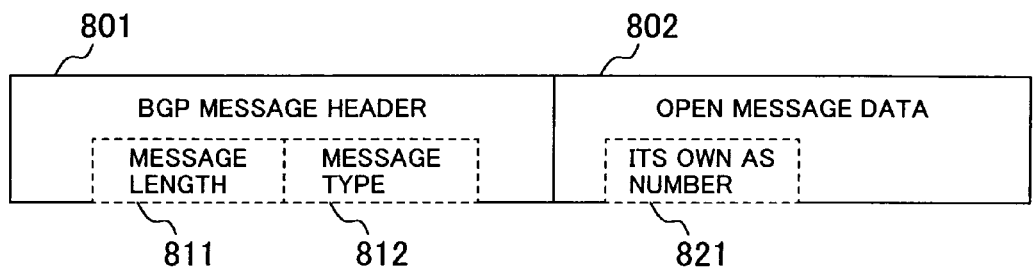
FIG. 8 is a structure of the data in a BGP open message.

FIG. 8 shows a structure of the data in a BGP open message.

BGP specifies some BGP messages and the open message is one of them. An open message is sent just after a TCP session is established when a peer session is established. The present invention can apply to such open messages regardless of the message format and timing for notifying the own AS number.

An open message includes such information items as GBGP message header 801 and open message data 802 as ruled by the BGP protocol standard. The BGP message header 801 includes such information items as message length 811, message type 812, etc. The message length 811 retains a byte length in accordance with the total of the BGP message header 801 and the open message data 802. Because BGP messages flow in a TCP session stream, the message length 811 is used to identify a range of one BGP message in each received TCP stream data. The message type 812 retains a value determined for each of such message types of open message, update message, etc. This message type 812 is checked for whether or not the message data following the BGP message header 801 is open message data or another message data part. The open message data 802 includes such information as an own AS number 821, etc. The own AS number 821 retains the number of the AS to which the open message source BGP router belongs. The BGP router can notify its own AS number to the peer router with use of this own AS number 821.

Figure 9:
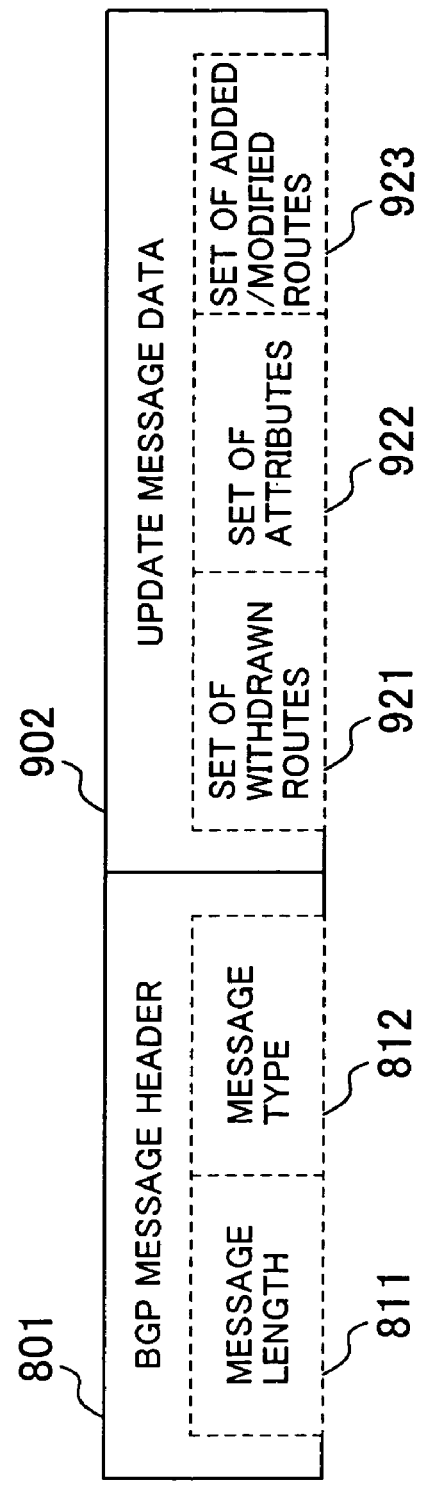
FIG. 9 is a structure of the data in a BGP update message.

FIG. 9 illustrates a structure of the data in a BGP update message.

Similarly to the open message, this update message is one of the BGP messages. An update message is used to notify addition/modification/deletion of routing information to an object peer router. This update message is only a BGP message type that includes routing information. Consequently, a message referred to as a BGP routing message in this specification is equivalent to this BGP update message. However, the present invention may apply to any message if how to handle the attribute information is in accordance with the presumption of the present invention regardless of the format and type of routing messages.

An update message is configured by items of BGP message header 801 and update message data 902 as ruled by the BGP protocol standard. The format of the BGP message header 801 is completely the same as that of the open message except that the field of the message length 811 retains a byte length of the total of the BGP message header 801, the update message data 902 and the field of the message type 812 retains a message type value denoting the update message. The update message data 902 is configured by three items; a set of withdrawn routes 921, a set of attributes 922, and a set of added/modified routes 923. The set of withdrawn routes 921 retains 0 or one or more destination address prefixes of a route to which no message can leads. The set of attributes 922 retains 0 or one or more attributes appendant to the added/modified routes 923. One attribute is represented by three items of attribute type, attribute length, and attribute value. The attribute type retains a value for denoting a type of each subject attribute (AS path attribute, MED attribute, next hop attribute, and other various attributes). The attribute length retains a byte length of an attribute value. The attribute value retains a value of each attribute (AS path, MED attribute value, or the like). The set of added/modified routes 921 retains 0 or one or more destination address prefixes of a route ensured newly for arrival or of which attributes are updated while it has been ensured for arrival. All the attributes included in the set of attributes 922 are applied to all the added/modified routes included in the set of added/modified routes 923.

When advertising the routing information related to a network layer protocol other than the IPv4 with use of the BGP, a set of destination address prefixes that cannot/can reach the destination is included in the set of attributes 922 with use of a special attribute having the functions equivalent to those of the set of withdrawn routes 921 and the set of added/modified routes 923 instead of those sets of withdrawn routes 921 and added/modified routes 923. However, the present invention can also apply to a case in which routing information is advertised in any data structure.

Figure 10:
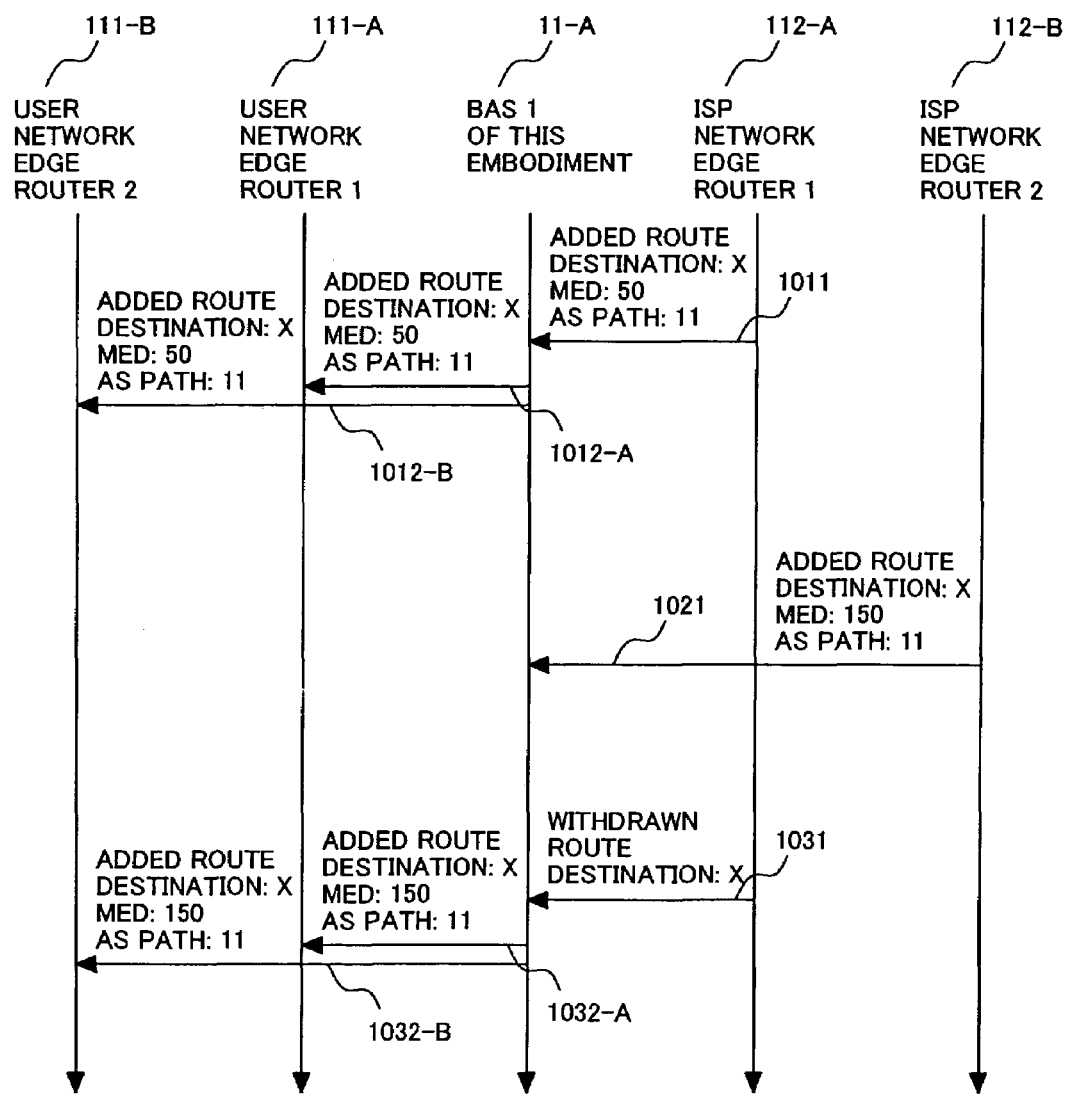
FIG. 10 is a communication sequence in which the BAS of the present invention receives a BGP routing message from an ISP network and relays the message to a user network in part of the network structure in the first embodiment of the present invention.

FIG. 10 illustrates a sending/receiving sequence when the BAS in this embodiment receives a BGP routing message from an ISP network and relays the message to a user network.

The BAS 11-A, when receiving routing information from any of the ISP network edge routers 112-A and 112-B, makes no routing information loop check. When advertising routing information to any of the user network edge routers 111-A and 111-B, the routing information is advertised as follows; the original MED attribute value is added to the routing information, its own AS number is removed if it is included in the AS path attribute of the routing information, and its own AS number is not added to the AS path attribute. The sending/receiving sequence shown in FIG. 10 is completely the same as that in the ordinary (conventional) BGP routing except for those operations described above. Just after the sequence shown in FIG. 10 is started, an EBGP peer session is already established between the user network edge routers 112-A and 112-B and the BAS 11-A, as well as between the ISP network edge routers 112-A and 112-B and the BAS 11-A and no advertisement is done yet with respect to the routing information related to the address prefix X. Advertisement of routing in other cAS's, for example, if a peer session is established after any of the ISP network edge routers 112-A and 112-B is advertised, is completely the same as that performed by the ordinary BGP routing except for the above attribute operation.

Hereinafter, the sending/receiving sequence will be described in detail. It is assumed here that the ISP network edge router 1 112-A sends a routing message to the BAS 11-A (step 1011). The routing message is related to addition of routes having a destination address prefix X respectively and the message has a MED attribute value of 50 and an AS path attribute in which only 11 is set as an ISP network AS number. Receiving this message, the BAS 11-A checks whether or not its own AS number is included in the AS path attribute of the message if the routing processing is an ordinary BGP one. If the check result is YES (included), the BAS 11-A discards the routing information, although the BAS in this embodiment does not discard the message. And, just like ordinary BGP routing processings, the BAS in this embodiment compares the routing information with each of those having an destination X respectively received so far from other peer routers to determine the optimal route. In this case, the BAS receives no routing information of the destination X from any peer router. The BAS thus determines the routing information received at that time as the optimal route. If newly received routing information is determined as the optimal route, the BAS 11-A updates its own upward traffic BGP routing table with that routing information and sends the updated portion of the routing information to the user network edge routers 111-A and 111-B as a routing message (steps 1012-A and 1012-B). If the routing processing is an ordinary BGP one at that time, the BAS 11-A does not add the received MED attribute value to the routing information to be sent while it adds its own AS number to the beginning of the AS path attribute. The BAS in this embodiment adds the received MED attribute value to the routing information as is while it does not add its own AS number to the AS path attribute. Instead, the BAS deletes all of its own AS numbers (or the elements in the set of AS numbers preset in the BAS) from the AS path attribute.

After that, the ISP network edge router 2 112-B is assumed to send a routing message related to addition of routes having a destination address prefix X respectively to the BAS 11-A (step 1021). The routing message has a MED attribute value of 150 and an AS path attribute in which only 11 is set as an ISP network AS number. Receiving that message, the BAS 11-A skips the AS path attribute check just like step 1011 and makes a comparison among the routing information items of the destination X received from other peer routers to determine the optimal route. In that case, the BAS 11-A has already received routing information of the destination X having a smaller MED attribute value from the ISP network edge router 1 112-A. Therefore, the routing information received at that time is not determined as the optimal route. And, the BAS 11-A does not update its own up-traffic BGP routing table nor sends any routing information to the user network edge router 111-A and 111-B.

After that, the ISP network edge router 1 112-A is assumed to send a routing message related to withdrawn routes having the destination address prefix X respectively to the BAS 11-A (step 1031). Receiving this message, the BAS 11-A discards the routing information of the destination X received from the ISP network edge router 1 112-A, then makes a comparison among the routing information items having the destination X received from peer routers other than the ISP network edge router 1 112-A to determine the optimal route. In this case, the routing information received from the ISP network edge router 2 112-B in step 1021 becomes the optimal route. The BAS 11-A then updates its own up-traffic BGP routing table with the optimal routing information and sends the updated portion of the routing information to the user network edge routers 111-A and 111-B as a routing message (steps 1032-A and 1032-B). At that time, just like the steps 1012-A and 1012B, the BAS 11-A adds the received MED attribute value to the routing information as is and does not add its own AS number to the AS path attribute while the BAS 11-A deletes all of its own AS numbers (AS number set elements preset in the BAS) from the AS path attribute.

Figure 11:
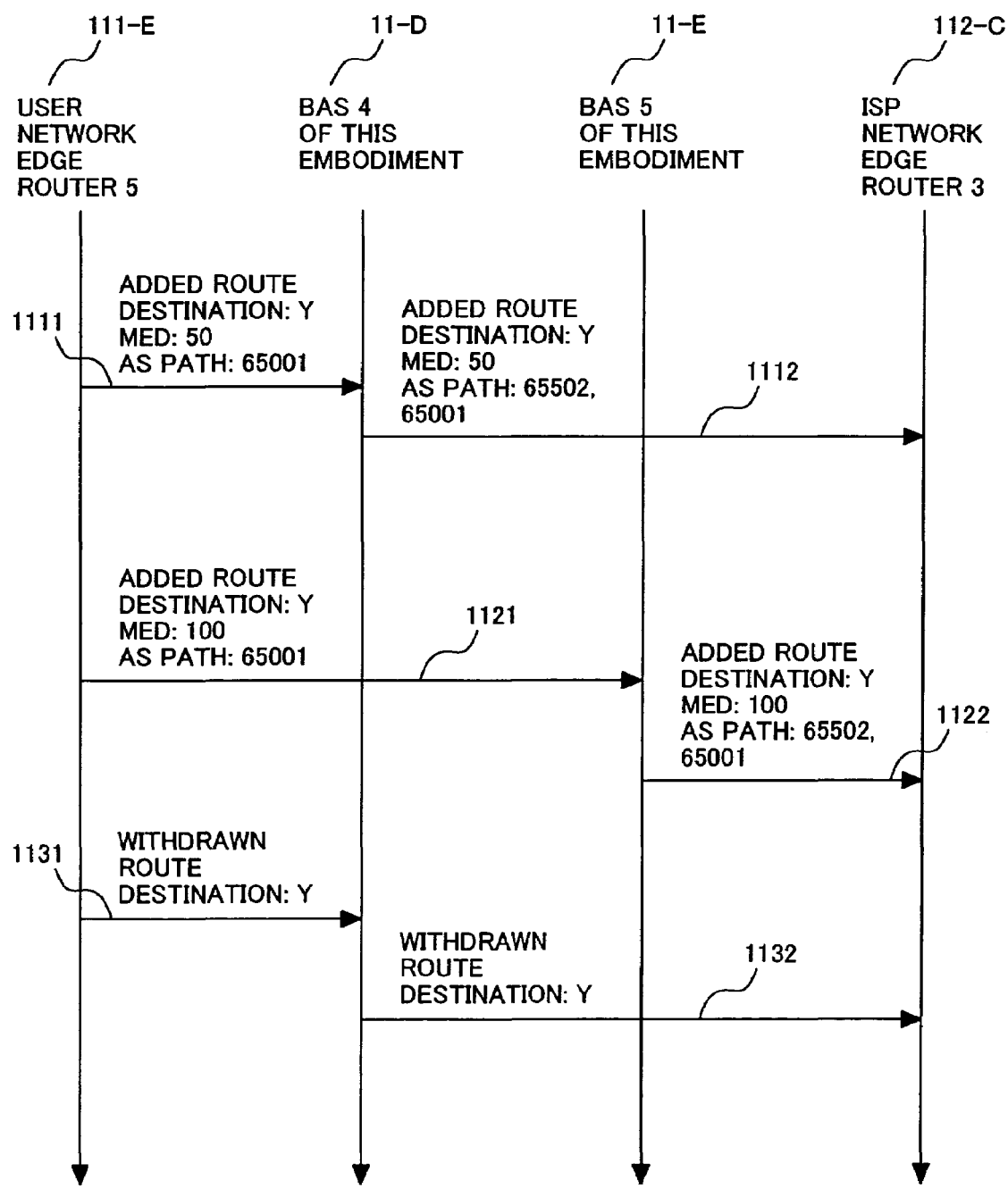
FIG. 11 is a communication sequence in which the BAS in the first embodiment of the present invention receives a BGP routing message from a user network and relays the message to an ISP network in part of the network structure in the first embodiment of the present invention.

FIG. 11 illustrates a sending/receiving sequence in which the BAS in this embodiment receives a BGP routing message from a user network and relays the message to an ISP network in part of the system in the first embodiment.

Each of the servers (BAS) 11-D and 11-E, when receiving routing information from the user network edge router 111-E, uses the ISP network AS number to make a routing information loop check or makes no check. When advertising routing information to the ISP network edge router 112-C, the BAS adds the received original MED attribute to the routing information, then advertises the routing information to the object. Except for this operation, the sending/receiving sequence shown in FIG. 11 is completely the same as that of the ordinary BGP routing. When the sequence shown in FIG. 11 is started, an EBGP peer session is already established between the user network edge router 111-E and the BAS 11-D, as well as between the ISP network edge router 112-C and the BAS 11-D. And, the routing information related to the address prefix Y is not advertised yet. Except for the above attribute operation, the sending/receiving sequence of the advertisement of the routing information other than the above case, for example, when a peer session is established after the user network edge router 111-E advertises routing information, may be completely the same as that of the ordinary BGP routing.

Hereinafter, the sending/receiving sequence will be described in detail. Here, the user network edge router 2 111-E is assumed to send a routing message related to addition of routes having a destination address prefix Y respectively to the BAS4 11-D (step 1111). The routing message has a MED attribute value of 50 and an AS path attribute that includes only a user network AS number of 65001. Receiving the message, the BAS4 11-D checks whether or not its own AS number is included in the AS path attribute of the message if the routing processing is an ordinary BGP one. If the check result is YES (included), the BAS4 11-D discards the routing information. However, the BAS in this embodiment uses the ISP network AS number for this check or makes no check. And, just like the ordinary BGP routing, the BAS4 11-D compares the routing information with those received from other peer routers to determine the optimal route. In this case, the BAS4 11-D receives no routing information having the destination Y from any other peer routers. The routing information received at that time is thus determined as the optimal route. If any of newly received routing information items is determined as the optimal route at that time, the BAS4 11-D updates its own down-traffic BGP routing table with the received routing information, then sends the updated portion of the routing information to the ISP network edge router 112-C as a routing message (step 1112). At that time, if the routing processing is an ordinary BGP one, the BAS4 11-D does not add the received MED attribute value to the routing information to be sent. The BAS in this embodiment adds the received MED attribute value to the routing information as is. The BAS4 11-D adds its own AS number to the AS path attribute at the beginning just like the ordinary BGP routing. The processor 211 processes the routing message with respect to the MED attribute, AS path attribute, etc.

After that, the user network edge router 111-E is assumed to send a routing message related to addition of routes having the destination address prefix Y respectively to the BAS5 11-E (step 1121). The routing message has a MED attribute value of 100 and an AS path attribute that includes only a user network AS number of 65001. Receiving this message, the BAS5 11-E receives routing information, determines the optimal route, and updates its own routing table just like the BAS4 11-D in step 1111, then sends the updated portion of the routing information to the object just like in step 1112 (step 1122).

After that, the user network edge router 111-E is assumed to send a routing message related to withdrawn routes having the destination address prefix Y respectively to the BAS4 11-D (step 1131). Receiving this message, the BAS4 11-D discards the routing information having the old destination Y received from the user network edge router 111-E, then makes a comparison between the routing information items having the destination Y received from peer routers other than the edge router 111-E to determine the optimal route. In that case, the BAS4 11-D has received no routing information of the destination Y from any peer router, so that the BAS4 11-D comes to loose the route to the destination Y. The BAS4 11-D then updates its own down-traffic BGP routing table with the withdrawn routes to the destination Y and sends the updated portion of the routing information, that is, withdrawn routes to the destination Y to the ISP network edge router 112-C as a routing message (step 1132).

Second Embodiment

Figure 12:
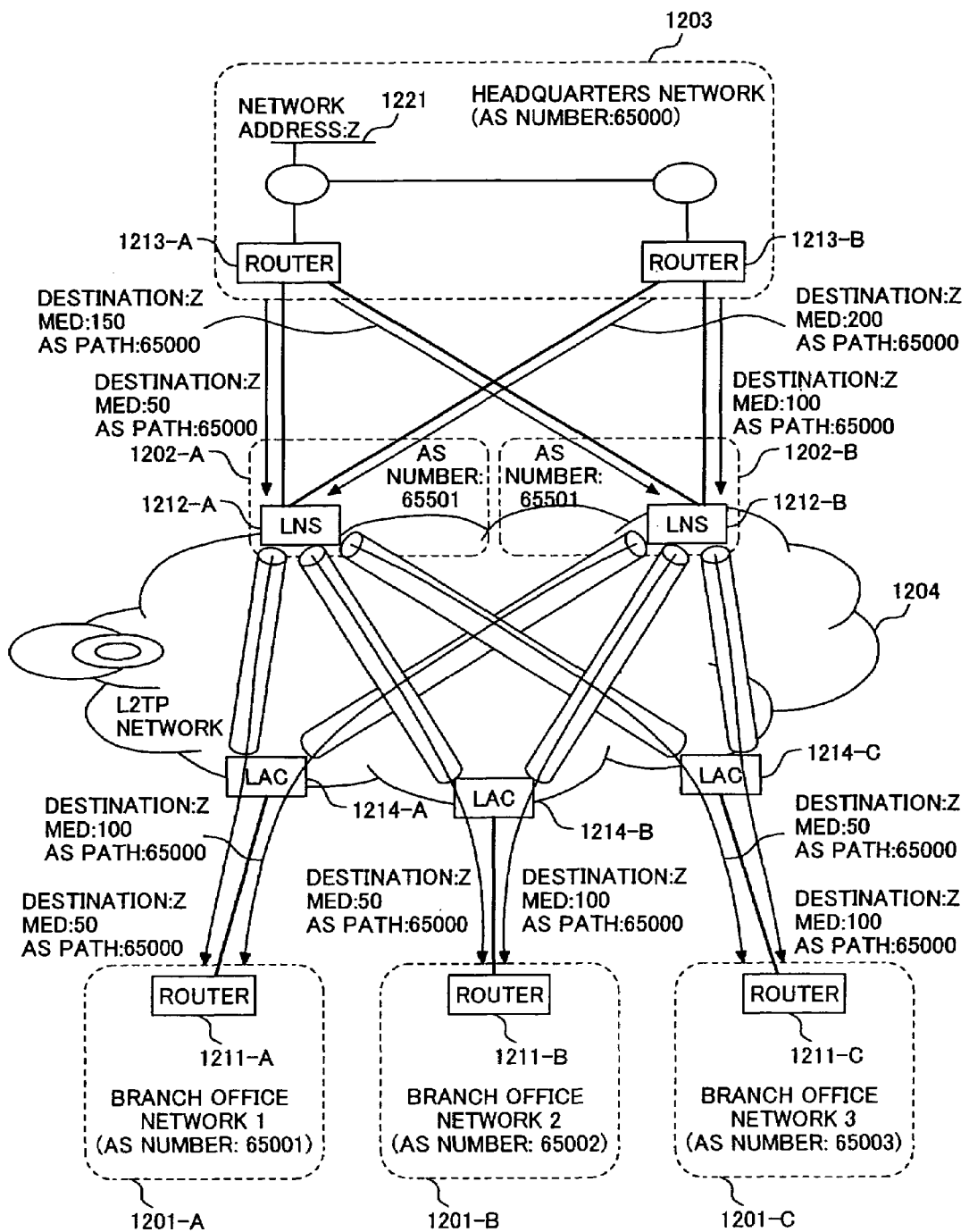
FIG. 12 illustrates a network structure that employs a BGP routing method in the second embodiment of the present invention.

FIG. 12 illustrates a block diagram of a network in this second embodiment, which uses a BGP routing method of the present invention.

In this second embodiment, a business corporation headquarter network 1203 and one or more branch office networks 1201-1A to 1201C are connected to each another through servers (LNS) (L2TP Network Server) 1212-A and 1212-B. Those network elements in this second embodiment correspond to those in the first embodiment. In other words, the headquarter 1203 in this embodiment is equivalent to the ISP network 103 in the first embodiment. Those components 1203 and 103 are the same in function when they are taken as transit autonomous systems (AS) for passing the IP packet traffic between branch offices (or between user networks); they are considered different from each other just in use purpose. However, the headquarter 1203 in this second embodiment may not be a transit AS; it may be a stub AS. The present invention can apply to any of the two cAS's. If the headquarter is a stub AS, the communication is possible between the headquarter and each branch office while the communication is impossible between branch offices. The branch office 1201 in this second embodiment is equivalent to the user network 101 in the first embodiment. Those components 1201 and 101 are the same in function when they are taken as stub autonomous systems (AS) for communicating with the headquarter network (or ISP network) to handle only the traffic sent from/received by its own AS; they are considered different from each other just in use purpose. The server (LNS) 1212 in this second embodiment is equivalent to the server (BAS) 11 in the first embodiment. Those components 1212 and 11 are considered to be the same when they are taken as BGP routers used for executing the BGP routing method of the present invention. They (1212 and 11) are also the same in function except that the layer 2 virtual line that employs a tunneling protocol referred to as L2TP is used for each branch office in the LNS 1212.

The headquarter 1203 and the branch offices 1201-A to 1201-C are configured as different autonomous systems (AS) respectively and each of them has a unique private AS number. Just like the BAS in the first embodiment, all of the servers (LNS) 1212-A and 1212-B in this second embodiment have the same private AS number as their own AS number, which is different from any of the private AS numbers of the branch offices 1201-A to 1201 C, however.

Each of the servers (LNS) 1212-A and 1212-B in this embodiment is connected to both of the headquarter network edge routers 1213-A and 1213-B. And, similarly to the first embodiment, headquarter network edge routers connected to one LNS must always belong to the same AS.

L2TP Access Concentrators (LAC) 1214-A to 1214-C are disposed between the servers (LNS) 1212-A and 1212-B and branch office networks 1201-A to 1201C. An IP network for tunneling with use of an L2TP is disposed between the LAC 1214 and the LNS 1212. An L2TP 1204 virtual layer 2 is used to provide a line between the LAC 1214 and the LNS 1212 as shown in FIG. 12. Each of the branch office edge routers 1211-A to 1211-C is connected to its corresponding one of the concentrators (LAC) 1214-A to 1214C through a physical or logical line. And, a tunnel is provided on this line so as to correspond to the L2TP at a one-to-one correspondence between the LNS and the LAC with use of the PPP protocol. Consequently, the branch office network edge routers 12111-A to 1211-C come to be connected to the servers (LNS) 1212-A and 1212-B directly through the IP layer respectively. The LAC 1214 functions as a router for the internal part of the L2TP network 1204. However, the existence of the LAC 1214 can be neglected when considering the BGP routing between the branch office network edge router 1211 and the LNS 1212, since the LAC 1212 is transparent to the IP layer outside the L2TP network.

In any embodiment of the present invention, any line may be used between a BGP router (the LAC in this second embodiment and the BAS in the first embodiment) that employs the BGP routing method of the present invention and the peer router if the continuity is assured in the layer 2. For example, another tunneling protocol that assures the continuity of the layer 2, such as MPLS, IPSec (Security Architecture for Internet Protocol), or the like may be used between the branch office network edge router 1211 and the LNS 1212 in this embodiment.

Through the line connection as described above, any of the headquarter network edge routers 1213-A and 1213-B can establish an EBGP peer session with both of the LNS 1212-A and the LNS 1212-B in this embodiment. Each of the branch office network edge routers 1211-A to 1211-C can establish an EBGP peer session with both of the servers (LNS) 1212-A and 1212-B in this embodiment. And, because each of the servers (LNS) 1212-A and 1212-B makes routing in accordance with the BGP routing method of the present invention, BGP policy routing can be realized between the headquarter network 1203 and each of the branch office networks 1201-A to 1201-C through those peer sessions.

For example, assume now that the routing information related to a route leading to a network having an IP address prefix Z existing in the subject headquarter network is flown to each branch office network with use of a BGP. However, it is assumed here that an IP packet having an address matching with the address prefix Z is passed sequentially through a line between the headquarter network edge router 1213-A and the LNS 1212-A, through a line between the headquarter network edge router 1213-B and the LNS 1212-B, through a line between the headquarter network edge router 1213-A and the LNS 1212-B, and through a line between the headquarter network edge router 1213-B and the LNS 1212-A by reason of the network configuration in the headquarter network 1203 and the line band width between the headquarter network 1203 and the LNS 1212.

In that connection, the BGP routing information related to the destination Z may be advertised by setting an MED attribute value of 50 for the advertisement from the headquarter network edge router 1213-A to the LNS 1212-A, 100 for the advertisement from the headquarter network edge router 1213-B to the LNS 1212-B, 150 for the advertisement from the headquarter network edge router 1213-A to the LNS 1212-B, and 200 for the advertisement from the headquarter network edge router 1213-B to the LNS 1212-A. Receiving those routing information items, the LNS 1212-A/B in this second embodiment makes a comparison between those routing information items related to the destination Z to select the optimal route, then advertises the optimal routing information in which the MED attribute value is kept as is to the branch office network edge routers 1211-A to 1211-C. Consequently, the routing information related to the destination Z, which includes an MED attribute value of 50 and that of 100 comes to be sent from the LNS 1212-A and from the LNS 1212-B to the branch office network edge routers 1211-A to 1211-C respectively. In addition, the servers (LNS) 1212-A and 1212-B seem to belong to the AS of the headquarter network 1203 from the standpoint of the branch office network edge router 1211 respectively. The branch office edge router 1211 thus makes a comparison between the routing information items received from both servers (LNS) using the MED attribute to select the routing information from the LNS 1212-A having a smaller MED attribute value.

As a result, the IP packet traffic from the branch office networks 1201-A to 1201-C is received by the network 1221 provided in the headquarter network 1203 through the LNS 1212-A and the headquarter network edge router 1213-A. If an error occurs in any of the LNS 1212-A, the headquarter network edge router 1213-A, and the line between the LNS 1212-A and the headquarter network edge router 1213-A, however, the routing information having the MED attribute value of 50 is deleted, so that the routing information having the MED attribute value of 100 is determined as the optimal routing information. The IP packet traffic is thus switched to a route through the LNS 1212-B and the headquarter network edge router 1213-B at that time.

What is claimed is:

1. A communication apparatus for connecting a stub network group consisting of one or more stub networks assigned one or more predetermined AS (Autonomous System) numbers respectively to an upstream network assigned an AS number, said communication apparatus having its own AS number, comprising:
means for storing said own AS number;
an interface for sending/receiving a routing message for controlling forwarding of information between autonomous systems (AS) in accordance with a predetermined routing protocol and an own AS number notification message to notify its own AS number to a foreign communication apparatus deployed in one stub network among said one or more stub networks or a foreign communication apparatus deployed in said upstream network;
notifying means for notifying said routing message and said own AS number notification message to said foreign communication apparatus in a stub network among said one or more stub networks or said foreign communication apparatus deployed in said upstream network through said interface;
a processor for processing said routing message; and
storage means for storing a routing software program used for said routing,
wherein when sending said own AS number notification message to said foreign communication apparatus deployed in a stub network among said one or more stub networks, said processor notifies said upstream network AS number to said foreign communication apparatus in said stub network among said one or more stub networks instead of its own AS number;
wherein when relaying a routing message received from said upstream network to a stub network among said one or more stub networks, said processor processes said routing message without discarding information related to a preferential route of forwarding a packet, said information being ruled by said routing protocol so as not to be relayed to any further AS beyond an AS which receives the information therein.

2. The communication apparatus according to claim 1, wherein said communication apparatus includes storage means for storing a set of AS numbers that are not included in any routing message to be sent to any stub network; and
wherein when relaying a routing message received from said upstream network to a stub network among said one or more stub networks, said processor does not discard said routing message even when its own AS number is included in the AS record information of AS's passed by said routing message, deletes all the AS numbers in said set of AS numbers from said AS record information, and processes said routing message without adding said own AS number to said AS record information, said AS record information being included in said routing message.

3. The communication apparatus according to claim 2, wherein said communication apparatus processes said routing message using its own AS number instead of said set of AS numbers.

4. The communication apparatus according to claim 2, wherein when processing said routing message received from a stub network among said one or more stub networks, said processor does not discard said routing message even when its own AS number is included in said AS record information of AS's passed by said routing message to process said routing message, said AS record information being included in said routing message.

5. The communication apparatus according to claim 4, wherein when processing a routing message received from a stub network among said one or more stub networks, said processor discards said routing message if the AS number of said upstream network is included in said AS record information of AS's passed by said routing message, said AS record information being included in said routing message.

6. The communication apparatus according to claim 2, wherein when processing a routing message received from a stub network among said one or more stub networks, said processor deletes all the AS numbers included in said set of AS numbers from said AS record information of AS's passed by said routing message to process said routing message, said AS record information being included in said routing message.

7. The communication apparatus according to claim 2, wherein a BGP is used as said routing protocol.

8. The communication apparatus according to claim 7, wherein an MED (Multi Exit Discriminator) attribute is used as the information related to said preferential route.

9. The communication apparatus according to claim 2, wherein a BGP is used as said routing protocol and an AS path attribute is used as the record information of said AS's passed by said routing message.

10. A communication apparatus according to claim 1, wherein the communication apparatus executes one or more functions of virtual communication apparatuses only in itself.

11. A communication method about inter-AS routing protocol, said method employed for a network for connecting a stub network group consisting of one or more stub networks, each having a predetermined AS number assigned to itself, to an upstream network assigned an AS number differently from any of said AS numbers assigned to said stub networks through a first router, said method comprising the steps of:
    enabling said first router to send a message to notify the AS number of said upstream network to a second router deployed in a stub network among said one or more stub networks as its own AS number;
    enabling said first router to send a message for notifying a predetermined AS number different from said upstream network AS number and the AS number of any of said stub networks in said stub network group to a third router deployed in said upstream network as its own AS number;
    enabling said first router to receive a routing message from said third router and send said message together with unmodified information related to a preferential route of forwarding a packet, the unmodified information being ruled by said routing protocol so as not to be relayed to any further AS beyond an AS which receives the information therein.

12. The communication method according to claim 11, wherein said first router, when relaying a routing message received from said third router to said second router, relays said routing message even when its own AS number notified to said third router is included in the AS record information of AS's passed by said routing message and does not include its own AS number in the AS record information stored in said relayed message, said AS record information being included in said routing message.

13. The communication method according to claim 12, wherein a BGP is used as said inter-AS routing protocol and AS record information of AS's passed by said routing message is an AS path attribute.

14. The communication method according to claim 11, wherein a BGP is used as said inter-AS routing protocol.

15. The communication method according to claim 14, wherein said information related to said preferential route is an MED attribute, said information related to said preferential route being ruled by said routing protocol so as to pass said AS and not to be relayed thereto.

16. A communication apparatus for connecting a stub network group consisting of one or more stub networks assigned one or more predetermined AS (Autonomous System) numbers respectively to an upstream network assigned an AS number, said communication apparatus having its own AS number, comprising:
    means for storing said own AS number;
    an interface for sending/receiving a routing message for controlling forwarding of information between autonomous systems (AS) in accordance with a predetermined routing protocol and an own AS number notification message to notify its own AS number to a foreign communication apparatus deployed in a stub network among said one or more stub networks or a foreign communication apparatus deployed in said upstream network;
    notifying means for notifying said routing message and said own AS number notification message to said foreign communication apparatus in a stub network among said one or more stub networks or said foreign communication apparatus deployed in said upstream network through said interface;
    a processor for processing said routing message; and
    storage means for storing a routing software program used for said routing,
    wherein when sending said own AS number notification message to said foreign communication apparatus deployed in a stub network among said one or more stub networks, said processor notifies said upstream network AS number to said communication apparatus instead of its own AS number; and
    wherein when relaying a routing message received from a stub network to said upstream network, said processor processes said routing message without discarding information related to a preferential route of forwarding a packet, said information being ruled by said routing protocol so as not to be relayed to any further AS beyond an AS which receives the information therein.

17. The communication apparatus according to claim 16, wherein said communication apparatus includes storage means for storing a set of AS numbers that are not included in any routing message to be sent to any stub network; and
    wherein said processor, when relaying a routing message received from said upstream network to a stub network, does not discard said routing message even when its own AS number is included in the AS record information of AS's passed by said routing message, deletes all the AS numbers in said set of AS numbers from said AS record information, and processes said routing message without adding said own AS number to said AS record information, said AS record information being included in said routing message.

18. The communication apparatus according to claim 17, wherein said communication apparatus processes said routing message using its own AS number instead of said set of AS numbers.

19. The communication apparatus according to claim 17, wherein when processing said routing message received from a stub network among said one or more stun networks, said processor does not discard said routing message even when its own AS number is included in said AS record information of AS's passed by said routing message to process said routing message, said AS record information being included in said routing message.

20. The communication apparatus according to claim 19, wherein when processing a routing message received from a stub network among said one or more stun networks, said processor discards said routing message if the AS number of said upstream network is included in said AS record information of AS's passed by said routing message, said AS record information being included in said routing message.

21. The communication apparatus according to claim 17, wherein when processing a routing message received from a stub network among said one or more stun networks, said processor deletes all the AS numbers included in said set of AS numbers from said AS record information of AS's passed by said routing message to process said routing message, said AS record information being included in said routing message.

22. The communication apparatus according to claim 17, wherein a BGP is used as said routing protocol.

23. The communication apparatus according to claim 22, wherein an MED (Multi Exit Discriminator) attribute is used as said information related to said preferential route, said information being ruled by said routing protocol so as to pass said AS and not to be relayed thereto.

24. The communication apparatus according to claim 17, wherein a BGP is used as said routing protocol and an AS path attribute is used as the record information of said AS's passed by said routing message.

25. A communication apparatus according to claim 16, wherein the communication apparatus executes one or more functions of virtual communication apparatuses only in itself.

26. A communication method about inter-AS routing protocol, said method employed for a network for connecting a stub network group consisting of one or more stub networks, each having a predetermined AS number assigned to itself, to an upstream network assigned an AS number differently from any of said AS numbers assigned to said stub networks through a first router respectively, said method comprising the steps of:

enabling said first router to send a message to notify the AS number of said upstream network to a second router deployed in a stub network among said one or more stub networks as its own AS number;

enabling said first router to send a message to notify a predetermined AS number different from any of said upstream network AS number and the AS numbers of said stub networks in said stub network group to a third router deployed in said upstream network as its own AS number;

enabling said first router to receive a routing message from said second router and send said message together with unmodified information related to a preferential route of forwarding a packet, the unmodified information being ruled by said routing protocol so as not to be relayed to any further AS beyond an AS which receives the information therein.

27. The communication method according to claim 13, wherein said first router, when relaying a routing message received from said third router to said second router, relays said routing message even when its own AS number notified to said third router is included in the AS record information of AS's passed by said routing message and does not include its own AS number in the AS record information stored in said relayed message, said AS record information being included in said routing message.

28. The communication method according to claim 27, wherein a BGP is used as said inter-AS routing protocol and AS record information of AS's passed by said routing message is an AS path attribute.

29. The communication method according to claim 26, wherein a BGP is used as said inter-AS routing protocol.

30. The communication method according to claim 29, wherein said information related to a packet forwarding-preferential route is an MED attribute, said information related to said packet-forwarding preferential route being ruled by said routing protocol so as to pass said AS and not to be relayed thereto.

* * * * *